(12) United States Patent
Boni et al.

(10) Patent No.: US 7,774,946 B2
(45) Date of Patent: Aug. 17, 2010

(54) METHOD AND DEVICE FOR NON-CONTACT MEASUREMENT OF THE ALIGNMENT OF MOTOR VEHICLE WHEELS

(75) Inventors: Fabio Boni, Florence (IT); Monica Carfagni, Pistoia (IT); Rocco Furferi, Florence (IT); Lapo Governi, Florence (IT)

(73) Assignee: FASEP 2000 S.r.l., Florence (IT)

( * ) Notice: Subject to any disclaimer, the term of this patent is extended or adjusted under 35 U.S.C. 154(b) by 284 days.

(21) Appl. No.: 11/832,111

(22) Filed: Aug. 1, 2007

(65) Prior Publication Data

US 2008/0148581 A1 Jun. 26, 2008

(30) Foreign Application Priority Data

Aug. 4, 2006 (IT) ............................. FI2006A0196

(51) Int. Cl.
*G01B 11/275* (2006.01)
(52) U.S. Cl. ...................... 33/203.18; 33/288
(58) Field of Classification Search .............. 33/203.18, 33/203.19, 203.2, 288; 356/139.09, 155
See application file for complete search history.

(56) References Cited

U.S. PATENT DOCUMENTS

| 5,054,918 | A | 10/1991 | Downing et al. |
| 5,274,129 | A | 12/1993 | Natale et al. |
| 5,600,435 | A | 2/1997 | Bartko et al. |
| 5,724,128 | A | 3/1998 | January |
| 5,724,129 | A * | 3/1998 | Matteucci ............... 356/139.09 |
| 5,724,743 | A | 3/1998 | Jackson |
| 5,978,077 | A | 11/1999 | Koerner et al. |
| 6,038,074 | A * | 3/2000 | Kitaguchi et al. ............ 359/618 |
| 6,064,750 | A | 5/2000 | January et al. |
| 6,134,792 | A | 10/2000 | January |
| 6,252,973 | B1 | 6/2001 | January et al. |
| 6,341,013 | B1 | 1/2002 | Battiti et al. |
| 6,397,164 | B1 | 5/2002 | Nobis et al. |
| 6,400,451 | B1 | 6/2002 | Fukuda et al. |
| 6,657,711 | B1 | 12/2003 | Kitagawa et al. |
| 7,224,357 | B2 * | 5/2007 | Chen et al. ................... 345/420 |

(Continued)

FOREIGN PATENT DOCUMENTS

DE 29 48 573 A1 6/1981

(Continued)

*Primary Examiner*—R. A. Smith
(74) *Attorney, Agent, or Firm*—McGlew and Tuttle, P.C.

(57) ABSTRACT

The invention relates to a method for non-contact measurement of the alignment of the wheels of a motor vehicle. In practice, the method provides for the steps of: applying a plurality of markers to the wheels of the motor vehicle along a line approximately substantially coaxial with the wheel; positioning, at each wheel for which the characteristic angles must be acquired, two image acquisition devices, with different inclinations with respect to said wheel; acquiring for each of said wheels, through each of said two image acquisition devices, at least one image of said wheel with the relative markers; determining, through epipolar and triangulation geometrical calculations, the equation of an approximate plane in which said markers lie in space, with respect to a reference system; determining the camber and toe angles of said wheel on the basis of the equation of said plane and of the equation of the reference planes with respect to which the motor vehicle takes a known position.

46 Claims, 12 Drawing Sheets

Image 1

Image 2

U.S. PATENT DOCUMENTS

| | | |
|---|---|---|
| 2005/0068522 A1 | 3/2005 | Dorrance et al. |
| 2006/0152711 A1 | 7/2006 | Dale et al. |
| 2006/0239542 A1* | 10/2006 | Corghi ................. 382/154 |
| 2006/0274303 A1 | 12/2006 | Jackson et al. |
| 2007/0185946 A1* | 8/2007 | Basri et al. ............. 708/200 |
| 2007/0283582 A1* | 12/2007 | Donner et al. ............ 33/228 |

FOREIGN PATENT DOCUMENTS

| | | |
|---|---|---|
| DE | 36 08 424 A1 | 9/1987 |
| DE | 197 57 760 A1 | 7/1997 |
| EP | 0 895 056 | 2/1999 |
| EP | 0 969 275 A2 | 1/2000 |
| EP | 0 971 205 A2 | 1/2000 |
| EP | 1 204 844 B1 | 5/2002 |
| EP | 1 669 715 | 6/2006 |
| TW | 536657 B | 6/2003 |
| WO | WO 99/03018 | 1/1999 |
| WO | WO 01/77617 A1 | 10/2001 |
| WO | WO 02/03027 A1 | 1/2002 |
| WO | WO 02/14784 A1 | 2/2002 |
| WO | WO 02/31437 A1 | 4/2002 |
| WO | WO 2004/061390 | 7/2004 |
| WO | WO 2005/033628 | 4/2005 |
| WO | WO 2005/090906 A1 | 9/2005 |
| WO | WO 2006/074026 | 7/2006 |
| WO | WO 2006/124642 | 11/2006 |

* cited by examiner

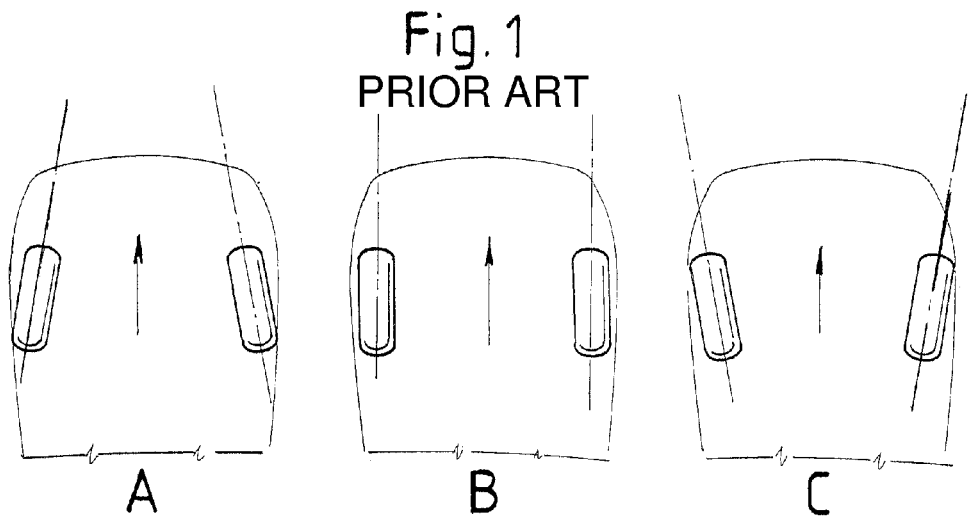
Fig. 1
PRIOR ART
A  B  C
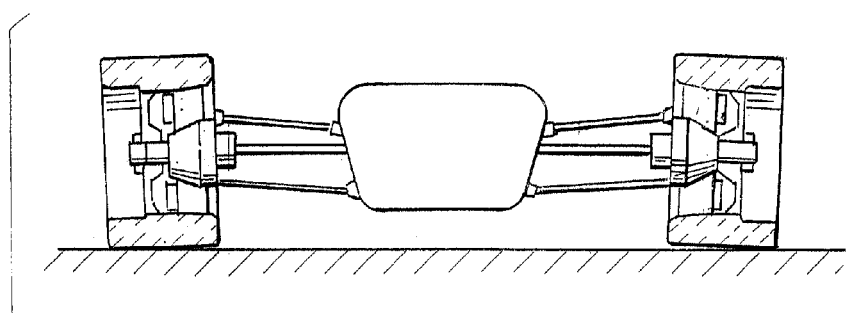
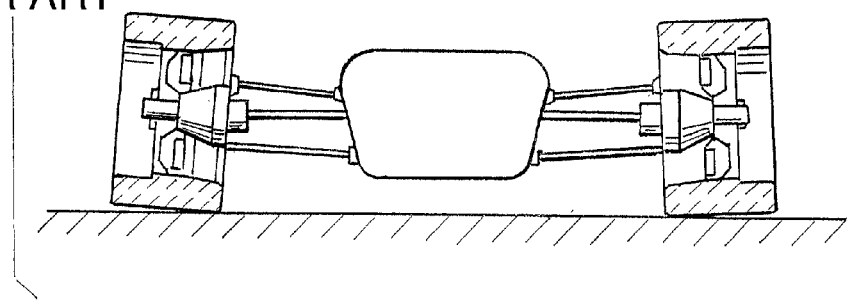
Fig. 2
PRIOR ART

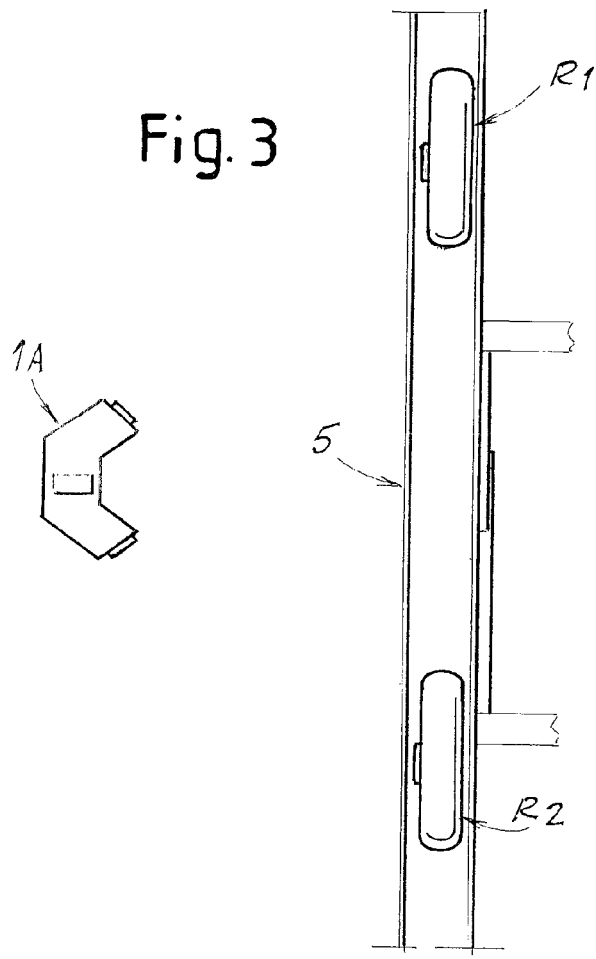
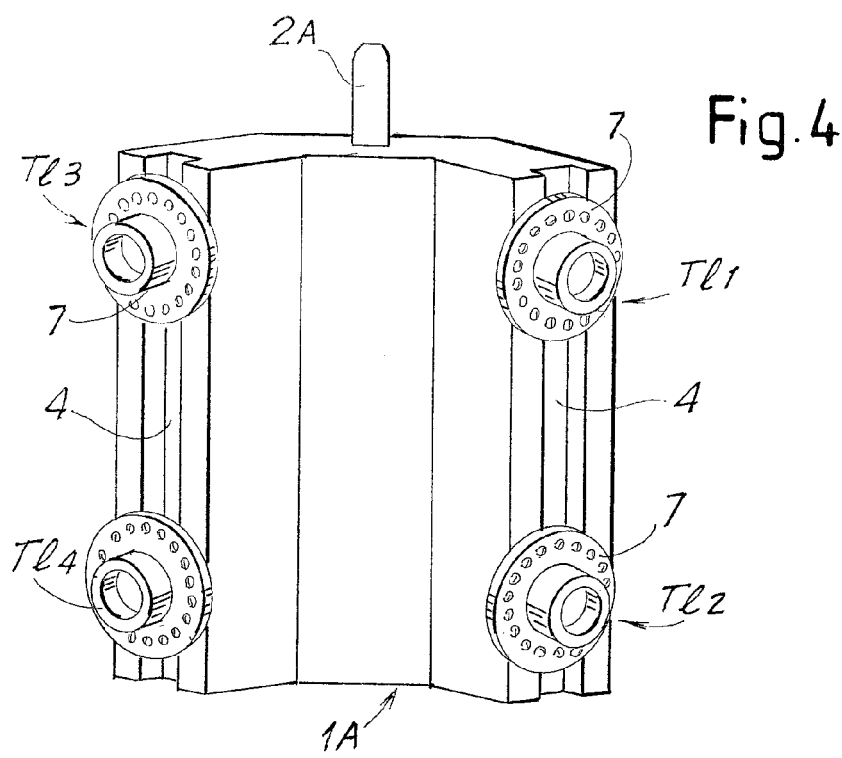

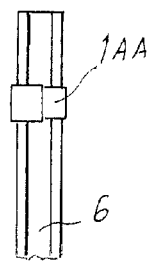
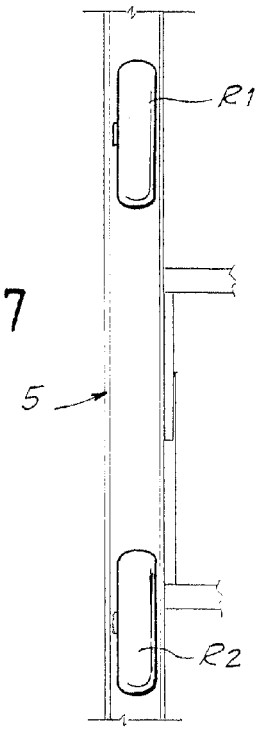
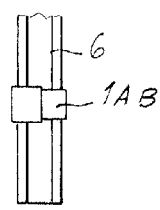
Fig. 7
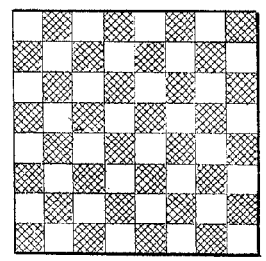
Fig. 8
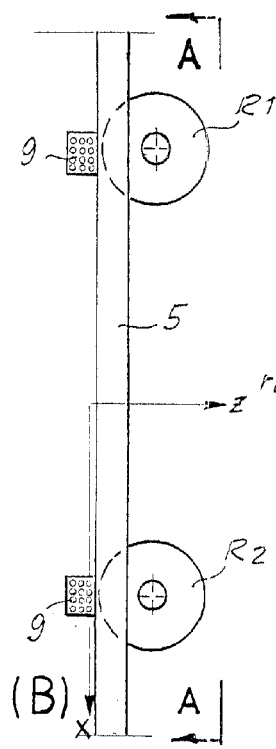
Fig. 9
Fig. 10

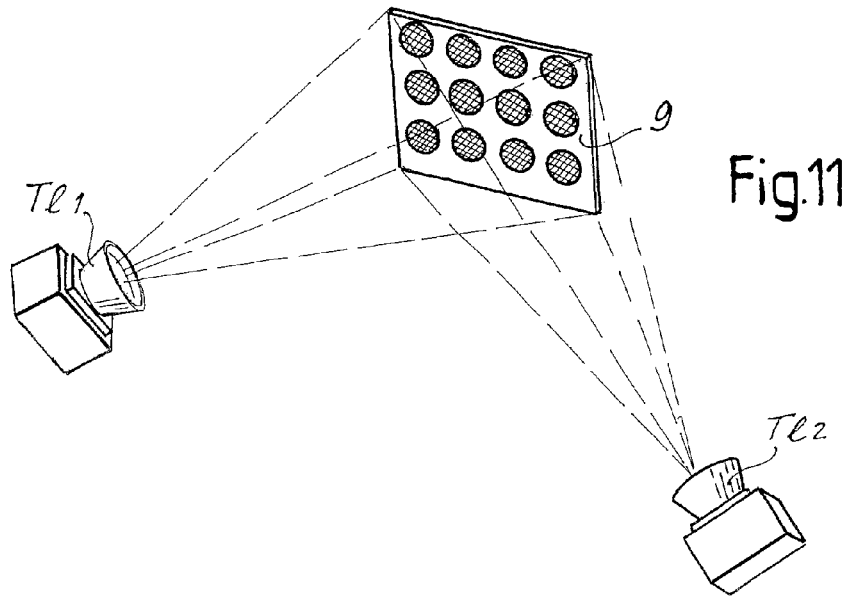
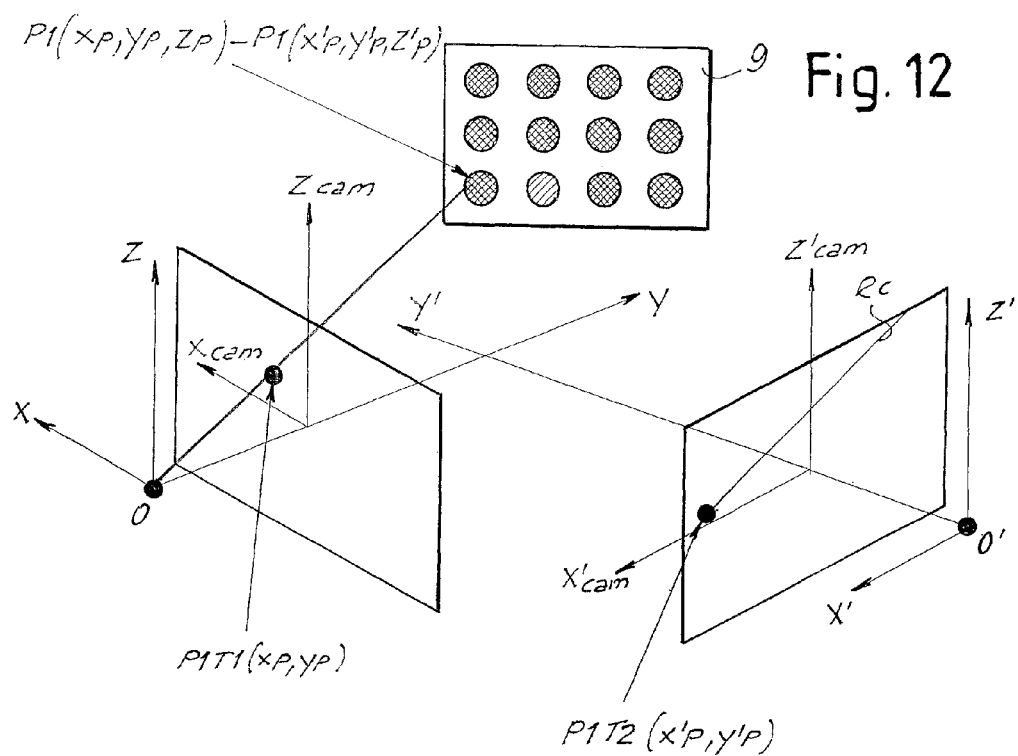

Fig. 21A
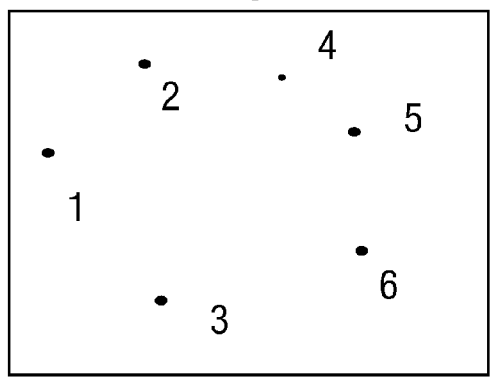
Image 1
Fig. 21B
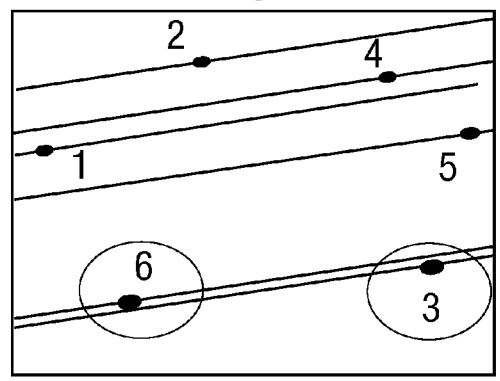
Image 2
Image 1
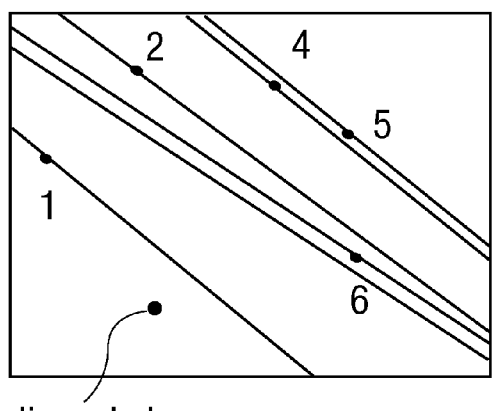
discarded Fig. 22A
Image 2
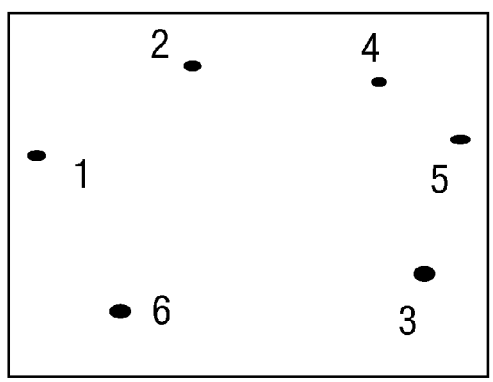
Fig. 22B

METHOD AND DEVICE FOR NON-CONTACT MEASUREMENT OF THE ALIGNMENT OF MOTOR VEHICLE WHEELS

TECHNICAL FIELD

The present invention relates to improvements to methods and to devices for measurement of the characteristic angles of the wheels of motor vehicles and of the alignment of the wheels.

In the present description and in the appended claims, motor vehicle is intended in general as a motorized vehicle with at least one pair of steering wheels, not necessarily for transporting persons (motor car) but also for other industrial or commercial uses.

STATE OF THE ART

Alignment of the wheels of a motor vehicle consist in correctly setting the characteristic angles of a wheel; one of these angles identifies the position of the wheel (when it is not turned) with respect to the ground, the other instead identifies the position of the steering axis (i.e. the imaginary line about which the entire assembly of hub, wheel bearing, rim and tyre rotates when the front wheel turns) with respect to the road surface. With reference to one of the two axles, two angles define the total toe angle, i.e. the angle formed by the rolling planes of the two wheels observing the vehicle from above. Each wheel has an individual toe angle which is the sum of the two individual toe angles and defines the total toe angle. If the two planes cross in front of the axle considered (with respect to the direction of drive) the angle is positive. The angle is instead negative if the two planes cross behind the axle. The second two angles which define the position of the wheel with respect to the ground are called camber angles and are identified between the rolling planes of the two wheels of an axle observing the vehicle from the front. More specifically, the camber angle of a wheel is the angle measured between the plane on which the wheel rolls and the center axis perpendicular to the ground.

FIGS. 1A, 1B, 1C and 2 show different values of the toe angles and of the camber angles, respectively.

It is known that set-up of the characteristic angles of the wheels of a motor vehicle, and in particular toe and camber, determine the behaviour of the vehicle on the road and contribute considerably to the comfort of the driver.

There have been developed various systems to control and adjust the characteristic angles of the wheels of a motor vehicle.

A first type of known devices provides for the use of "targets" fixed rigidly to the wheels of the motor vehicle and placed in a frontal direction to the acquisition system. Systems of this type are described in U.S. Pat. No. 6,134,792; U.S. Pat. No. 5,724,128; U.S. Pat. No. 5,724,743, U.S. Pat. No. 5,724,743, US2005068522. The targets are usually applied to wheels inclined by approximately 45 degrees. As the angle is not known in advance, an initial "compensation" procedure is required, which consists in moving the vehicle backward and then forward again with the targets connected to the wheel so that through the difference the processor acquires the initial mounting positions. This procedure is not popular with users, also due to the intrinsic danger of moving a vehicle located on a vehicle lift.

There are similar systems in which the target is fixed to the lift (U.S. Pat. No. 6,064,750; U.S. Pat. No. 6,252,973) and the wheel is fixed so that the position thereof with respect to the reference system constituted by the lift is known (starting from the presumption that the lift is sufficiently rigid to form an excellent reference system).

The aforesaid systems have the following problems or disadvantages:

- the need to position the equipment by fixing it to the wheel (being measured); therefore, the measurement is intrusive;
- increase in measurement times caused by mounting;
- mounting precision: an error in the positioning of the target on the wheel causes a larger error in the measurement of the angles;
- mounting stability: the targets must be mounted on the wheel with extremely stable connections to prevent propagation of measurement errors during movements and rotations of the wheel in the normal operations to set the characteristic angles.

There have also been produced different apparatus for measuring the angles that do not use markers or targets fixed rigidly with the wheel. These systems (U.S. Pat. No. 5,978,077, U.S. Pat. No. 6,400,451, U.S. Pat. No. 6,657,711) use a laser device that projects, in specific positions on the wheel, a coherent monochrome beam of light which can also be structured (i.e. of known shape). An optical acquisition system (digital camera, video camera, or the like), calculates the distance of the wheel from the laser projector on the basis of the acquired images of the beam of light. Through calculation of the distance it is possible to measure the toe and camber angles.

Other patents (U.S. Pat. No. 5,054,918; U.S. Pat. No. 5,600,435) provide for measurement of the characteristic angles with a non-contact method. This is obtained by measuring three points defined on the wheel, obtained through three laser lines. After referring the measurement to a fixed system by means of trigonometric equations the real values are measured. These systems are characterized by their considerable constructional complexity. Moreover, the measurement is largely related to the physical dimensions of the rim. On the other hand, the advantages of these systems is that they perform non-contact measurement of the toe and camber angles. The disadvantage is that, as the measurement is based on calculation of the distances and on the measurement of the reciprocal position of the two (or more) video cameras that acquire the image, the precision of the method is largely related to the spatial resolution of the acquisition devices (whether these are CCD or CMOS). it is not possible to obtain subpixel level.

Other non-contact angle measurement systems are described in DE-A-2948573, which explains the general principle consisting in the use of video cameras or other acquisition devices to identify the profile of the rim. This profile is generally constituted by an ellipse, as the projection is in the plane of a circumference in space. When the camber and toe angles vary there is a variation in the axes (major and minor) of ellipse identified. Determination of the major axis, of the minor axis and of the intersection of the two axes takes place through the use of techniques based on image processing. By determining these three parameters it is possible, with geometric relations, to obtain orientation of the plane in which the wheel lies with respect to the longitudinal axis of the vehicle.

WO-A-0177617 describes a method wherein the number of points to reconstruct the ellipse is not chosen randomly, but with a method based on successive approximations. The system provides for placing the video cameras in a fixed quadrilateral located outside the vehicle, but not on the vehicle. The quadrilateral is constituted by four video cameras which each view one wheel of the vehicle with a certain angle. The images acquired by the video camera are treated with an equalization to which a Sobel or Laplace operator is applied and the edges of the figure (ellipse, lines, etc.) are then extracted with a threshold. This system does not use natural light, but infrared light and uses a suitable infrared filter on the video camera which reduces, or rather eliminates, the effect of the ambient lighting. Once the edge of the ellipse has been extracted, with the defects of the rim minimized, a least square fit algorithm is applied to the conic equation.

WO-02/03027 describes a method for determining the inclination of a wheel, and in particular for non-contact determination of the toe and camber angles. This system is based on the application (usually during the production stage) of structured markers to the rim or to the tyre of a vehicle. A video camera placed in front of the wheel (i.e. on the side of the vehicle) then acquires images of the wheel and of the markers to obtain the characteristic angles. This method can only be applied if pre-marked rims or tyres are used. Alternatively, the person performing the measurement can apply the structured markers to the wheel, but in this case the drawbacks related to the need to use structured markers are again encountered. The problem is exacerbated by the fact that this method is based on the use of markers all differing from one another on a same wheel.

WO-A-2005/090906 describes a system to measure the toe angles of the wheels of a motor vehicle, based on the use of pairs of video cameras placed in front of the wheels, i.e. at the side of the vehicle. The method is based on recognition of the edge of the rim and requires complex calculations, besides being subject to errors in the case of defects in the rim, such as dents or the like.

OBJECTS AND SUMMARY OF THE INVENTION

An object of an embodiment of the invention is to provide a system to determine the characteristic angles of the wheels of a motor vehicle that entirely or in part overcomes the drawbacks of prior art.

In particular, an object is to provide a high precision and simple to use system, which is non-contact, i.e. does not require the highly precise application of targets of specific shape or structure on the wheels or on the lift.

According to a possible embodiment of the invention, the method comprises the following steps:
  applying a plurality of markers to the wheels of the motor vehicle along a line approximately circumferential and substantially coaxial with the wheel;
  disposing, at each wheel, two image acquisition devices, with different inclinations with respect to said wheel;
  for each wheel, acquiring, by means of each of said two image acquisition devices, at least one image of said wheel with the relative markers;
  determining, through epipolar and triangulation geometrical calculations, the equation with respect to a reference system of an approximate plane on which said markers lie in space, said plane being substantially parallel to the plane on which the wheel lies;
  determining the camber and toe angles of said wheel on the basis of the equation of said plane on which the markers lie and of the equation of reference planes with respect to which the motor vehicle takes a known position.

In general, the method can be implemented with an arrangement of video cameras or other image acquisition devices, whose reciprocal position with respect to the supporting structure of the vehicle are known. In a particularly simple embodiment of the invention, in fact, the acquisition devices can be arranged in fixed and known positions, at the sides of a lift on which the motor vehicles, whose toe and camber angles are to be measured, are positioned. In this way operations to calibrate the video cameras and to determine the relative positions of the video cameras with respect to an absolute reference system are unnecessary. These data are necessary to correct any positioning defects of the vehicle on the lift or other equivalent supporting structure.

The idea underlying the invention, therefore, consists in the fact of performing a non-contact measurement, and without the need to apply targets of various types to the wheels, thereby avoiding consequent problems related to measurement precision. On the contrary, the plane in which each wheel lies is identified by stereo observation (i.e. with two video cameras or other image acquisition devices whose reciprocal position is known) of simple stickers, points or non structured markers applied to an approximately circular line on the wheel. The markers could even be applied with a simple felt tip pen of suitable colour.

Acquisition from different angles of the two images of the markers allows the position in space, i.e. with respect to a suitable Cartesian reference, of the markers on the wheel or, more specifically, of the barycentric points of these markers, to be traced through triangulation. As the markers lie approximately in a plane parallel to the median plane of the wheel, inclination of the plane in which the markers lie, which approximates the surface in which they lie with respect to the horizontal and vertical reference planes, allows the camber and toe angles of the wheels to be traced.

According to an advantageous embodiment of the method of the present invention, the markers are made with an ink or other invisible material, which can however be identified, for example, with near infrared (IR) or ultraviolet light. This avoids the need to remove the markers from the wheels. Moreover, the use of a marker visible in the UV or IR range allows the points of interest on the image (UV or IR) acquired by the video cameras to be more easily identified, eliminating from these images elements differing from the markers required to calculate the aforesaid angles.

Although this does not actually take place, if placing of a vehicle on a lift or other supporting structure with high precision is hypothesized, so that the center line of the vehicle is parallel with the longitudinal axis of the supporting structure, the toe angles could be determined directly once the reciprocal position of the two video cameras of each pair associated to a specific wheel is known, simply by identifying, on the basis of epipolar geometry and of triangulation, the coordinates of the markers with respect to the reference system associated with one of the video cameras that acquires the image of the respective wheel. In fact, parallelism of the vehicle with respect to the supporting structure and knowledge of the equations of the reference planes integral with the supporting structure expressed in the reference system integral with the video camera of a specific pair allow the toe angles to be determined directly.

However, generally speaking when a motor vehicle is placed on the lift to determine the toe and camber angles, it will always be slightly offset with respect to the center line of the lift, which is parallel to one of the Cartesian axes defining the horizontal and vertical reference planes, with respect to which the camber and toe angles must be determined. This requires correction of the toe angle determined by each pair of video cameras for each wheel.

For this purpose, according to an advantageous embodiment of the invention, the method provides for a preliminary step aimed at determining the position of said motor vehicle with respect to the reference planes on the basis of the position of the acquisition devices with respect to a single reference system. In substance, this entails identifying the position of all the centers of the video cameras or other image acquisition devices with respect to the center of a reference system, taken as absolute, centered on one of said video cameras. As will be apparent hereunder, this allows determination of the three-dimensional coordinates of all the centers of the four wheels of the motor vehicle with respect to said absolute reference system and therefore identification of the center line of the vehicle and the angle that it forms with the reference planes integral with the lift or other supporting structure of the vehicle, to thus compensate for "run-up", i.e. the angular positioning error of the vehicle with respect to the lift.

An advantageous embodiment of the invention provides for determination of the reciprocal position between the video cameras and a supporting structure of the motor vehicle through calibration of said video cameras using targets integral with said structure and in known position with respect to said reference planes. The targets have a pattern, preferably visible in the infrared or ultraviolet range, constituted by simple geometrical figures, such as rectangles, squares or circles. The stereo images of these targets are taken by the video cameras of each pair and the barycentric points are identified on the images. By applying epipolar geometry the corresponding barycentric points on the two images are identified and the equation of the plane in which the target lies is calculated by triangulation. If this coincides with the vertical plane passing along the side of the lift, the equations of the other two planes of a reference system integral with the lift can be reconstructed, by lines orthogonal to one another defined by at least three barycentric points of three corresponding images on the target.

Preferably, according to an advantageous embodiment of the invention, the pair of image acquisition video cameras are at least partly movable with respect to the supporting structure of the vehicle. In this case, once the device is positioned with respect to the supporting structure of the motor vehicle, a calibration operation is performed to determine the position of each pair of video cameras with respect to the supporting structure and the position of each video camera with respect to an absolute reference system, advantageously integral with one of the video cameras and centered with respect to its sensing element. Having defined the reciprocal position of the video cameras of each pair of cameras, the relative position of each pair of cameras to the supporting structure is performed by a calibration operation using one or more targets integral with the supporting structure.

In an advantageous embodiment of the method according to the invention there are provided the steps of:
  for each wheel, acquiring two images, one for each of said at least two video cameras associated with said wheel;
  on said images, determining points corresponding to the markers on the wheel;
  through an operation using epipolar geometry, determining the correspondence between the points on a first of said two images and the points on a second of said two images;
  on the basis of the coordinates of said points in the two image planes, determining by triangulation the coordinates in a three-dimensional system of said markers;
  determining in said three-dimensional system the equation of a plane that approximates the surface in which said points lie.

According to a further aspect, the invention relates to a device for measuring angles of inclination of the wheels of a motor vehicle, comprising:
  a supporting structure of the motor vehicle;
  for each wheel of the motor vehicle, a pair of image acquisition devices;
  a control and processing unit programmed to perform a measurement method as defined above and described in greater detail below.

Further advantageous features and embodiments of the method and of the device according to the invention are described hereunder with reference to some non-limiting embodiments.

BRIEF DESCRIPTION OF THE DRAWINGS

The invention will be better understood in the light of the description of some non-limiting embodiments, illustrated in the accompanying drawings. More specifically, in the drawing:

FIGS. 1A-1C; 2 show diagrams indicating the toe and inclination angles of the wheels of a motor vehicle;

FIG. 3 shows a schematic and partial plan view of a first configuration of the device according to the invention;

FIG. 4 shows an axonometric view of a part of the supporting column of the video cameras of the device in FIG. 3;

FIG. 7 shows a schematic and partial plan view of the device in FIG. 6;

FIG. 8 shows a grid for calibration of a pair of video cameras;

FIG. 9 shows a diagram indicating the axes of the fixed reference system, integral with the lift;

FIG. 10 shows a possible target integral with the fixed reference, for calibration of the pairs of video cameras of the measurement system;

FIGS. 11 and 12 show two diagrams to illustrate the calibration operations of the video cameras with reference to the target in FIG. 10;

FIGS. 15 to 22 show real images in reverse or negative format, acquired by two video cameras associated with a wheel to illustrate the algorithm to identify the correspondence in the two images of the barycentric points of the markers on the wheel.

DETAILED DESCRIPTION OF EMBODIMENTS OF THE INVENTION

Description of the Components of the Measurement System

Figure 5:
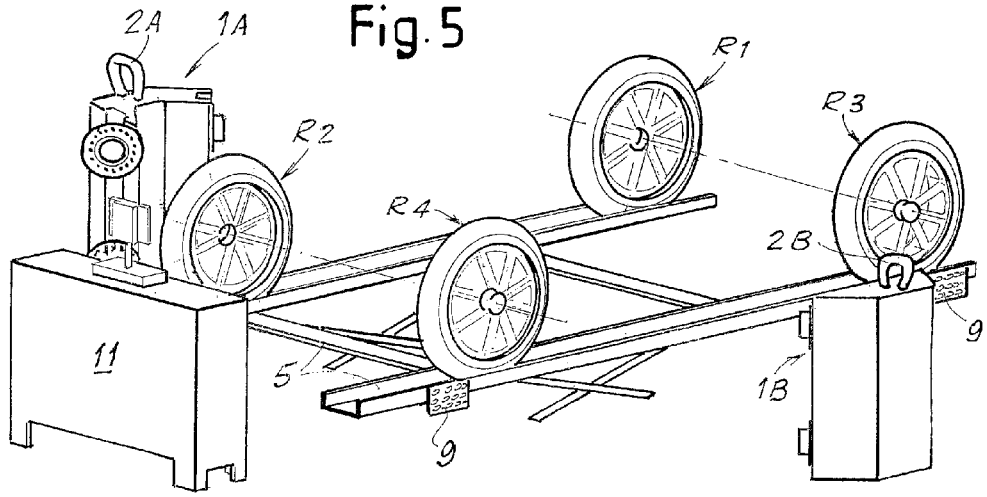
FIG. 5 shows an axonometric view of the measurement device in FIG. 3.

With reference to FIGS. 3 to 5, the components of the measurement device will initially be described, limited to what is necessary to understand the present invention. Subsequently, there will be described the operating principle and the method to determine the toe and camber angles using the device illustrated.

In an advantageous embodiment, the system comprises an acquisition column for each side of the vehicle. The columns are indicated with 1A and 1B in the diagram in FIGS. 3-5. Preferable, four video cameras, for example CCD or CMOS cameras, are mounted in each column 1A, 1B. In the diagram the video cameras are indicated with TI1, TI2, TI3, TI4 for the column 1A and TI5, TI6, TI7, TI8 for the column 1B. They can be movable, for example along guides 4 integrated in the column 1A, 1B, and tiltable. In an alternative embodiment the video cameras are fixed with respect to the columns on which they are mounted. As will be apparent below from the description of the calculation method, if the video cameras are movable with respect to the column on which they are mounted, at each repositioning of the video cameras with respect to the column it is necessary to perform calibration of the individual video cameras to obtain the matrix that relates the position of one video camera to the other. Vice versa, if the video cameras are fixed to the column, this calibration is not necessary, or rather is performed once during mounting.

The video cameras are dedicated in pairs to one of the four wheels R1, R2, R3, R4 of a motor vehicle positioned on the lift 5. For example, the video cameras TI1, TI2 are dedicated to the wheel R1, and the video cameras TI3, TI4 to the wheel R2 in FIG. 5. This arrangement of two video cameras for each wheel is required for triangulation of the position of the wheel in space, as will be explained in greater detail below.

According to a possible embodiment of the invention, the columns 1A, 1B can be provided with handles 2A, 2B for movement thereof. According to an advantageous embodiment, said columns can translate on respective guides parallel to the lift 5. Alternatively, the columns can be in a position fixed to the ground.

Each wheel is illuminated by light sources associated with the video cameras. According to an advantageous embodiment of the invention, the illumination is obtained by LEDs, which preferably emit in the infrared or ultraviolet range, depending upon the type of target used. The use of IR or UV radiation allows invisible targets to be used. The illumination can be integrated in the video camera, as schematically represented by LEDs 7 in FIG. 4, or in other areas of the column. It is also possible to use illumination with Wood's light. The two video cameras associated with each wheel R1, R2, R3, R4 (provided with UV or IR filter in relation to the type of target used) acquire a pair of images in which only what is marked on the wheel is visible, as described in greater detail below. By calibrating the individual acquisition devices (video cameras) and determining the reciprocal position (stereoscopic calibration) with care, it is possible, using epipolar geometry (triangulation), to determine for each pair of images the position in space of the points marked with respect to a reference system of one of the two video cameras (the position of the other is relative to this and known).

In an embodiment of the invention, the measurement system also comprises a target 9 fixed on the lift for each wheel R1, R2, R3, R4. The target will advantageously be invisible, in the sense that it can be viewed by a video camera operating in the IR or UV range. The target 9 can have different shapes and be characterized by patterns with different geometry. The function of this target is to create a fixed reference system for the video camera of reference. Through triangulation of the points indicated on the target 9 fixed to the lift and through trigonometric calculations it is possible to determine the position of points marked in proximity of the rim of each wheel with respect to the fixed reference system with the criterion described below in greater detail. In substance, the plane in which the wheel lies is determined by acquiring stereo images of each wheel, to which approximate marker points have been applied along a circumference concentric to the center of the wheel. The plane in which the marker points lie is substantially parallel to the median plane of this wheel, and therefore its intersection with the Cartesian reference planes integral with the lift determines the camber and toe angles.

The data of the images acquired by the video cameras TI1-TI8 can be transferred to a processor 11 to be processed through USB 2.0 or through frame grabbers or in any other suitable way and can be performed either with a wired or wireless connection.

Figure 6:
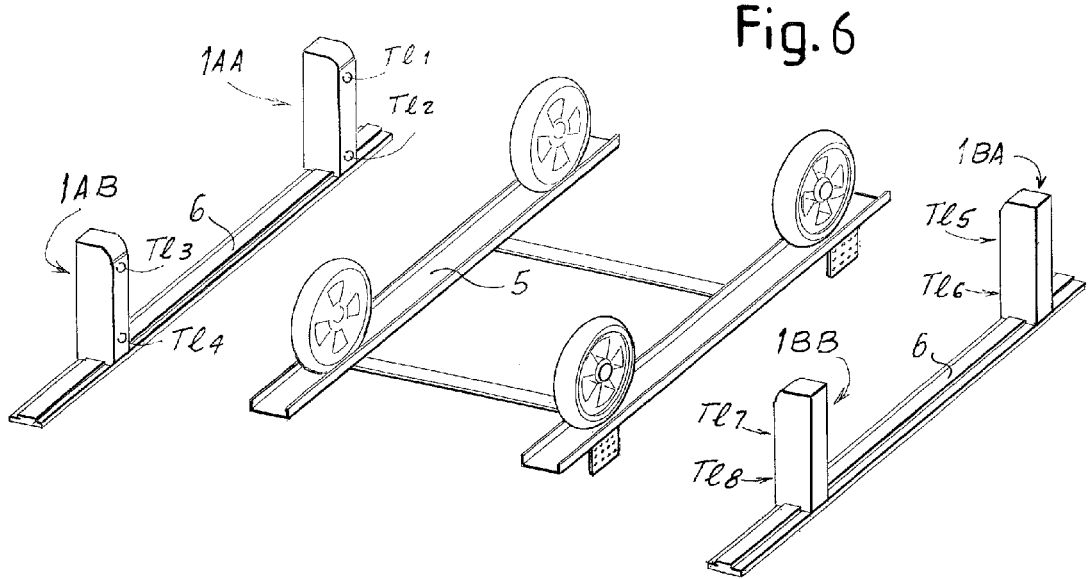
FIG. 6 shows an axonometric view of a different embodiment of the device according to the invention.

FIGS. 6 and 7 schematically show a different configuration of the measurement device. In this case there are provided two acquisition columns 1AA, 1AB; 1BA, 1BB for each side of the lift 5 and therefore of the motor vehicle (not shown and of which only the wheels R1, R2, R3, R4 are indicated) positioned thereon. On each column two respective CCD or CMOS video cameras are mounted, indicated with TI1, TI2, TI3, TI4, TI5, TI6, TI7, TI8, which can be movable and tiltable, or fixed with respect to the column. Each pair of video cameras mounted on a column is dedicated to a respective wheel in order to triangulate the position of the wheel in space. The use of two video cameras per wheel allows triangulation of the 3D position of the wheels. According to a possible embodiment, the four columns can be provided with a handle analogous to the handles 2A, 2B indicated for the columns 1A, 1B for movement thereof. In a possible embodiment the columns can translate on respective guides 6, so that they can run longitudinally (parallel to the lift). In a different embodiment, movement can be free, i.e. without guides or other constraints with respect to the floor. According to yet another embodiment, the four columns can be fixed, or two of them can be fixed, for example those dedicated to the front wheels of the vehicle disposed on the lift, while the remaining two are movable, freely or on guides.

Also in this embodiment each wheel is illuminated, for example by LEDs, which emit in the infrared or in the ultraviolet, according to the type of invisible target used. The illumination can be integrated in the video camera or in other areas of the column. Also in this case it is possible to use illumination with Wood's light. The two video cameras associated with a wheel R1, R2, R3 or R4, provided with UV or IR filter in relation to the type of target used, will acquire a pair of images of the wheel, in which only what is marked on the wheel with UV or IR ink is visible.

In this embodiment as well, the system comprises an invisible target 9, fixed on each side of the lift 5, or two targets on each side.

The use of guides and/or handles for the column allow the columns to be moved as desired and also, if required, the columns to be placed after use in an area that does not obstruct other mechanical operations.

As will be apparent from the description below, it is not necessary to know the position of the columns with respect to the plane of the wheel with precision, but it is sufficient for all the video cameras to view the targets 9 in the acquisition area. For this purpose, in the embodiment with one column per side there are provided two targets 9 for each side of the lift, while in the case of two columns per side a single target 9 can be provided per side.

Description of the Measurement Method

Having described the structure of the detection and measurement devices, operation thereof both with reference to the system in FIGS. 3 to 5, and with reference to the system in FIGS. 6 and 7 is described below.

Below there will be discussed a complete measurement procedure which allows determination firstly of the reciprocal position of the two video cameras of each pair and subsequently of all the video cameras with respect to a video camera of reference, assuming that these positions are unknown in advance. From this information it is then possible, through the two images taken by each pair of video cameras associated with each wheel to which suitable markers have been applied, to calculate the camber and toe angles.

However, as will be explained below with reference to other embodiments, the invention can be implemented in a more simple, although less flexible, manner, and in certain cases with less precision, by determining the reciprocal position of the video cameras in another manner, or by assuming these positions as known. For example, in the simplest hypothesis the eight video cameras can be placed in the same number of known and unchangeable positions, in which case it is not necessary to perform calibration to determine the reciprocal position at each measurement.

Briefly, with reference to an embodiment of the invention wherein the reciprocal position of the various video cameras is unknown, the measurement is based on the following steps:
1. calibration (single or stereo) of the video cameras or other image acquisition device and of their reciprocal position on each column 1A, 1B or 1AA, 1AB, 1BA, 1BB,
2. calibration of the position of the acquisition device with respect to an absolute reference system integral with the lift 5,
3. acquisition and transfer of the images through the video cameras,
4. triangulation and measurement of the plane of the wheels,
5. numerical determination of the angles of interest (toe, camber),
6. run-out compensation of the vehicle (deviation of the angles of the wheel with respect to the reference system when the motor vehicle is positioned on the lift).

The individual steps will now be described in detail.

The preliminary calibration step is provided as, before proceeding with 3D triangulation of the points marked on the rim or in proximity of the rim of the wheel, complex mathematical operations are required to determine the exact reciprocal position of the acquisition devices and their position with respect to the lift. In fact, the position of the video cameras in space is not known in advance and, even if the system housing the acquisition devices is kept "level", in actual fact there is a rotation matrix R (function of the three angles of pitch, roll and yaw) that relates the two video cameras associated with a specific wheel to each other and each video camera to the reference 9 on the lift 5. To determine the position of the video cameras it is also necessary to know a vector T of three elements that indicate the coordinates along the three coordinated axes of the center of the CCD with respect to the reference.

In general, after defining an external reference system xyz, for example integral with the lift 5 on which the vehicle is positioned, a reference system of coordinates xc, yc, zc, can be defined for each video camera, with origin in the center of the CCD sensor of the video camera. Each point of the scene observed by the video camera will have coordinates X(xyz) in the external reference and Xc (xc, yc, zc) in the reference system centered on the video camera. In general, the two reference systems X and Xc are related to each other by the following matrix equation:

$$Xc = RX + T$$

or $$\begin{bmatrix} x_c \\ y_c \\ z_c \end{bmatrix} = \begin{bmatrix} r_{11} & r_{12} & r_{13} \\ r_{21} & r_{22} & r_{23} \\ r_{31} & r_{32} & r_{33} \end{bmatrix} \begin{bmatrix} x \\ y \\ z \end{bmatrix} + \begin{bmatrix} t_x \\ t_y \\ t_z \end{bmatrix}$$

In other words, the coordinates of one point of the scene with respect to an absolute reference system X and with respect to a system integral with the video camera with center in the sensor of this camera, are related to one another by a rotation matrix R and by a translation vector T.

Each point of the scene observed by the video camera, then, will have on the plane of the image of the video camera a position defined by two coordinates xi, yi in a two-dimensional system of coordinates Xi.

Given two video cameras arranged in two positions in space, a reference system centered on the center of the sensor of each video camera can be defined for each one, and each point of the scene viewed by the two video cameras has a position definable by three coordinates of a system integral with one or other of the two video cameras. For each pair of reference systems (absolute system, system centered on the first video camera and system centered on the second video camera) there will be a rotation matrix and a translation vector that relates the coordinates of one point of the scene expressed in a reference system to coordinates of the same point in the other reference system.

Without going into too many analytical details, returning to the measurement system of the present invention, which provides for a pair of video cameras for each wheel, it can be said that there are three rotation matrices and three translation vectors that relate the two video cameras of each pair considered, i.e. of each pair associated with a specific wheel of the vehicle, to each other:
1. $R_1$ matrix of the rotations of the first video camera with respect to an absolute reference system integral with the lift;
2. $T_1$ vector of the 3D coordinates of the CCD of the first video camera with respect to the absolute reference system;
3. $R_2$ matrix of the rotations of the second video camera with respect to the absolute reference system;
4. $T_2$ vector of the 3D coordinates of the CCD of the second video camera with respect to the absolute reference system;
5. $R_{12}$ matrix of the reciprocal rotations of the first video camera with respect to the second video camera;
6. $T_{12}$ vector of the coordinates of the CCD sensor of the second video camera with respect to the reference centered on the first video camera. In the more general case, the measurements indicated above are all unknown and would remain so even if the devices were positioned with care. In fact, due to the imperfect planarity of the ground or of the lift, and to the imperfect rigidity of the system (column) housing the video cameras, reciprocal positioning of the devices cannot be performed with absolute precision. Therefore, even if the reciprocal position of the video cameras of a pair was known in advance, to obtain greater measurement precision it would nonetheless be advisable to proceed with a calibration step as described below, to determine again at each measurement the rotation matrices and the translation vectors that relate the video cameras of each pair to each other. In particular, the following must be calibrated:
1. each single video camera to correct the aberrations caused by the lens, to determine the center of the CCD, the focal length and to determine the position of the video cameras with respect to the target 9 which is in front of the video camera (determination of the vectors $T_1$ and $T_2$ and of the matrices $R_1$ and $R_2$).
2. each pair of video cameras so as to determine the vector $T_{12}$ and the matrix $R_{12}$ which determine the positions and the relative angles between the two video cameras of the pair. After these matrices are known it is also possible to calculate a 3×3 matrix called fundamental matrix (F) which will be used to determine the epipolar line that will allow triangulation of the images obtained by the two video cameras of each pair to be performed to determine the position of the plane of the wheels.

As known, calibration (see, for example: Mubarak Shah "*Fundamentals of computer vision*" University of Central Florida Computer Science Department, 1992; pages 11-13, or Jean-Yves Bouguet "*Visual methods for three-dimensional modeling*"), is performed using a target in which objects of known shape are reproduced. One type of target that can be used for this purpose is shown in FIG. 8. As a rule, some images of the target in different positions (i.e. rotated and translated with respect to the two video cameras) must be acquired simultaneously by each video camera of a pair.

The calibration algorithms, known per se and available both on the market and in open source, identify how the geometry of the geometrical figures drawn on the target varies and, through extremely rapid analysis in computational terms, allow both the intrinsic parameters of the individual devices and, with absolute precision, the reciprocal position of the two devices (one of which is taken as reference) to be known. Therefore, in substance with this initial calibration step of the video cameras of each pair the coefficients of the fundamental matrix F are determined. This step of calibrating the individual video cameras TI1-TI8 in order to determine the intrinsic parameters and the relative positions of the video cameras of each pair is performed only once or if necessary repeated at relatively long intervals of time to take into account any long term variations, or in the case of reciprocal movement between video cameras of a same pair, which can be caused by accidental or deliberate causes.

The second step is the one of measuring and calibrating the position of the video cameras, with respect to an absolute reference system, integral with the lift. In particular the following must be calibrated:

the position of a pair of video cameras with respect to a fixed reference system (integral with the lift), the position of the other three pairs of video cameras with respect to the first. This allows identification of the position of all video cameras with respect to the reference system considered absolute, integral with the lift.

With reference to FIG. 9, the three Cartesian axes Oxyz with origin in a predetermined point integral with the lift and with the axes orientated so that the axis z is vertical upward and the plane xy lies in the plane of the lift are considered as absolute reference system. The target 9 lies in the plane xz of this reference system.

To obtain the position of a first pair of video cameras with respect to the absolute reference system Oxyz defined above, the target 9 applied to the lift is used. According to an embodiment of the invention, the target 9 is constituted by a plane on which known geometrical shapes are drawn. These shapes can be either visible or produced with invisible materials (which only reflect in the infrared or in the ultraviolet range). In general it is advisable for the geometrical shapes drawn on the target to be visible in the IR and/or UV range and they can be visible or invisible in the range of radiation visible to the naked eye. Visibility in the UV and/or IR range allows images to be obtained of the geometrical shapes of the target from which all other images are eliminated by filtration.

FIG. 10 shows an example of target 9 for determination of the absolute reference system. In this case the geometrical figures are constituted by circles 9C. The lines $r_a$ and $r_b$ just as the axes x and y shown in FIG. 10 are not actually drawn in the real target 9 applied to the lift 5, but are provided to understand the calibration method. Having considered the rigidity of the lift 5, the plane in which the target 9 lies can be taken as plane xz of the absolute reference system. The shape and the number of the geometrical FIG. 9C and of the target 9 can differ from those shown. The only restriction to be observed is that the target must lie in the plane xz and that the shapes produced thereon must allow identification of the lines $r_a$ and $r_b$, parallel to the axes x and z, for purposes that will be apparent below.

Considering any one of the pairs of video cameras associated with the wheels, i.e. one of the pairs of video cameras fixed to the column 1A, 1B or 1AA, 1AB, 1BA, 1BB, the two video cameras of this pair "see" the target from two different points of view as schematized in FIG. 11. In this example the video cameras TI1 and TI2 are considered as the initial pair for calibration, although any of the four pairs can be taken as initial pair of video cameras.

Each video camera sees the target 9 in the respective image plane. With reference to FIG. 12, $\pi 1$ and $\pi 2$ indicate the two image planes of the two video cameras TI1, TI2. It must be noted how the images acquired are in black and white. This is due to the fact that using a target with invisible figures and using an infrared (or ultraviolet) viewing system it is possible to view images in which only the elements of interest are present, that is, in this case, only the circular patterns 9C on the target 9. Regardless of the type of pattern represented, the barycentric point of each figure is determined through a known algorithm. In the case of the circles 9C, this coincides, for each circle, with the center of this circle.

A point P1 of the target 9 (e.g. the center of one of the circles 9C) has real coordinates in space (3D coordinates) P1(Xp,Yp,Zp) with respect to the video camera TI1 and real coordinates P1(X'p,Y'p,Z'p) with respect to the video camera TI2. Moreover, the same point is visible in the images acquired by the two video cameras and therefore has planar coordinates (in the plane of the image) $P_1 T_1(x,z)$ for the video camera TI1, i.e. in the plane $\pi 1$ and $P_1 T_2(X',z')$ for the video camera TI2, i.e. in the plane $\pi 2$.

For known epipolar geometry (see Richard Hartley, Andrew Zisserman "*Multiple View Geometry in Computer Vision*", Cambridge University Press, Second Edition, March 2004, pages 237-323) the point $P_1 T_1(x,z)$ viewed in the image acquired by the video camera TI1 corresponds to a line in the image acquired by TI2. In other words, given a point $P_1 T_1(x,z)$ in the image acquired by the video camera TI1, this will obviously be visible also in the video camera TI2, but its coordinates $P_1 T_2(x',z')$ cannot be deduced directly from knowing the reciprocal position of the video cameras with respect to each other. It is instead known that the point lies on the epipolar line indicated schematically with re in FIG. 12, the equation of which is known once the fundamental matrix F has been calculated and is given by where $P_1 T_1$ are the coordinates of the point P in the plane $\pi 1$ and F is known by calibration of the video cameras TI1, TI2 performed as described above. The coordinates of the point $P_1 T_2(X',z')$ can however be calculated as the coordinates of the point of the image acquired by the video camera TI2 closest (in terms of point-line distance) to the epipolar line. In fact, owing to the lens of the devices, to the image resolution (which actually discretizes the signal performing a discrete two-dimensional brightness function) and due to the calculation precision, the epipolar line passes very close to the barycenter of the corresponding point, but not perfectly thereon. Therefore, the same epipolar line can also pass close to other points which however are not corresponding. For this reason the corresponding point is determined through the distance.

Once the coordinates $P_1 T_1(x,z)$ and $P_1 T_2(x',z')$, i.e. the coordinates of the point P1 of the target in the images acquired by TI1 and TI2, are known, it is possible to triangulate the position of the point in space thus calculating the coordinates P1(Xp,Yp,Zp) of the point P1 with respect to the reference system XYZ having origin in the center of the video camera TI1 and the coordinates P1(X'p,Y'p,Z'p) of the same point P1 with respect to the system of reference X'Y'Z' having origin in the center of the video camera TI1. These coordinates are obtained by trigonometric equations (Jean-Yves Bouguet "*Visual methods for three-dimensional modeling*", cited).

The same operation is performed for all the barycentric points of the figures drawn on the target 9 (in this case the centers of the circles 9C) to obtain a set of points in space of known coordinates with respect to the reference systems represented by the sets of three Cartesian axes XYZ and X'Y'Z' having origin respectively in the center O of the video camera TI1 and in the center O' of the video camera TI2.

At this point it is possible to calculate the equation of the plane xz in which the points of the target lie with respect to the two video cameras TI1, TI2. This equation is calculated by approximation, as the barycentric points of the graphic elements 9C could lie in a surface that is not perfectly flat, due to unavoidable mechanical tolerances. In particular, taking as reference the three axes XYZ having origin in the center O of the video camera TI1, according to an advantageous embodiment of the invention it is possible to calculate the equation of the plane that best approximates to the minimum squares the points identified on the target 9. This plane will be taken as reference for all measurements performed by the system. Moreover, with reference to FIG. 10 it is possible to obtain the equation of the lines $r_a$ and $r_b$ (bear in mind that the equation of the lines is in space) with respect to the three Cartesian axes XYZ having origin in the center of the video camera TI1 taken as reference. Finally, knowing the equation of the plane xz and of the lines $r_a$ and $r_b$ it is possible to calculate the equation of the planes xy and yz (FIG. 9).

To summarize, at the end of the operations described above the following have been obtained:

the intrinsic parameters of the video cameras, in order to correct any aberrations of the lens, through a known calibration procedure of the individual video cameras;

the position of the video camera TI2 with respect to the video camera TI1, taken as reference, through calibration of the reciprocal position of these, again with known systems;

analogously, the reciprocal position of all the video cameras in twos (for the four pairs of video cameras the reciprocal position is known through the calibration procedure of the individual image acquisition devices and of the reciprocal position of the devices of each pair);

the equation of the planes xy, xz and yz of the fixed reference on the lift with respect to the video camera TI1 (and consequently also with respect to TI2, knowing the position of TI2 with respect to TI1), by the calibration procedure described with reference to FIGS. 11, 12;

This allows the acquisition columns 1A, 1B or 1AA, 1AB, 1BA, 1BB to be moved as desired, without having to measure their movements and/or rotations with other methods. In fact, if the video cameras view the reference 9, the aforesaid system allows automatic recalibration at all times. This recalibration operation must be performed each time the operator moves, for any reason, one or more pairs of video cameras.

Knowing the equation of the planes xy, xz and yz of the reference on the lift 5 with respect to the video cameras TI1 and TI2 is not sufficient for the purposes of total evaluation of the angles on the four wheels of the vehicle. In fact, what is still not known in the measurement chain is the position of the six video cameras TI3, TI4, TI5, TI6, TI7 and T18 with respect to TI1 taken as reference. As the reciprocal position of each pair (i.e. the position of one video camera of a pair with respect to the other video camera of the same pair) is in any case known from initial calibration, it is sufficient to measure the position of the video cameras TI3, TI5 and TI7 with respect to the video camera TI1. This operation depends on the type of architecture used. Only in the case of the architecture shown in FIG. 5, the position of the video camera TI3 with respect to the video cameras TI1 and TI2 is known by construction. This is not true for the embodiment shown in FIG. 6.

The position of the video camera TI5 with respect to the video camera TI3 is measured by positioning on the lift, on the side of the acquisition system defined by the video cameras TI4, TI5, TI6 and TI7, a target 9 equivalent to the one positioned in front of the video camera TI1. As the new target 9 is also fixed to the lift, it will be parallel to the first (with the exception of machining tolerances). In this way the relation between the two targets 9 is known. In fact, they will be parallel and placed at a distance equal to the width of the lift 5. Repeating the same operations described for the video camera TI1 and with reference to the video camera TI5 for this second target 9, the equation x'z' of the plane of the new target with respect to the video camera TI5 is obtained. Knowing the analytical relation between the two planes xz and x'z' it is possible to measure the reciprocal position of TI5 with respect to TI1.

At this point there are no more unknown values as the position of the video camera TI7 is known by construction once the position of the video camera TI5 has been determined.

In the case in which the embodiment shown in FIG. 6 is chosen, the position of the video camera TI3 with respect to the video camera TI1 is not known in advance. The problem is solved by ensuring that both pairs of video cameras (TI1, TI2) and (TI3, TI4) see the same target 9 on the plane xz integral with the lift 5. In this way by repeating the same operations described for the video camera TI1, an equation of the plane xz relative to the video camera TI3 is obtained. Knowing the equation of the plane xz with respect to the video camera TI1 and knowing the one with respect to TI3 it is possible, through trigonometric relations, to determine the position of the video camera TI3 with respect to TI1. Analogously, it is possible to determine the position of TI7 with respect to TI5. Finally, knowing the relation between TI3 and TI1 the measurement chain is determined completely. In an alternative embodiment, there can be positioned on each side of the lift two targets 9, one in front of each of the columns 1AA, 1AB, 1BA, 1BB of the system in FIG. 6. Knowing the reciprocal position of the targets it is possible to determine the reciprocal position of all the video cameras. For example, if the two targets 9 on a same side of the lift lie in the same plane xz, knowing the distance along x of the two targets it is possible to calculate the position of the video cameras TI3, TI4 with respect to the video camera TI1.

Alternatively, it is possible to determine the relative position of the video cameras TI1, TI2, TI3, TI4 and of their homologues on the opposite side of the lift by placing a known image in front of the video cameras, for example of the type shown in FIG. 8, and performing stereo calibration of the video cameras in pairs, to determine the reciprocal position.

Having determined the position of each video camera with respect to an absolute reference, integral with the lift and therefore with respect to the vehicle positioned on said lift, it is possible to perform acquisition and processing of an image of markers made on the wheels, to perform the measurement of the angles of interest by determination of the plane in which the markers lie.

In fact, through the stereo images acquired by each pair of video cameras for each wheel it is possible to determine the position of the plane in which the wheel lies, substantially parallel to the plane in which the markers applied to the wheel lie, with respect to a reference system integral with the lift. This is already sufficient to determine the camber angles. With regard to the toe angles, the run-up error, i.e. imperfect parallelism of the car with respect to the lift, must be taken into account and corrected. In fact, the toe angle with respect to the reference system xyz integral with the lift is determined through stereo viewing of the markers of each wheel. If (as in actual fact occurs) the center line of the vehicle is not perfectly parallel to the axis x of this reference system, but offset by an angle α, the toe angle measured by the pair of video cameras with respect to the reference system xyz must be corrected to obtain the true toe angle. For this purpose, as will be explained in greater detail below, it is sufficient to know the position of all the centers of the video cameras with respect to a video camera of reference. In this way it is possible to determine, with respect to this reference video camera, the position of the centers of the wheels and correct the toe angle.

Figure 13A:
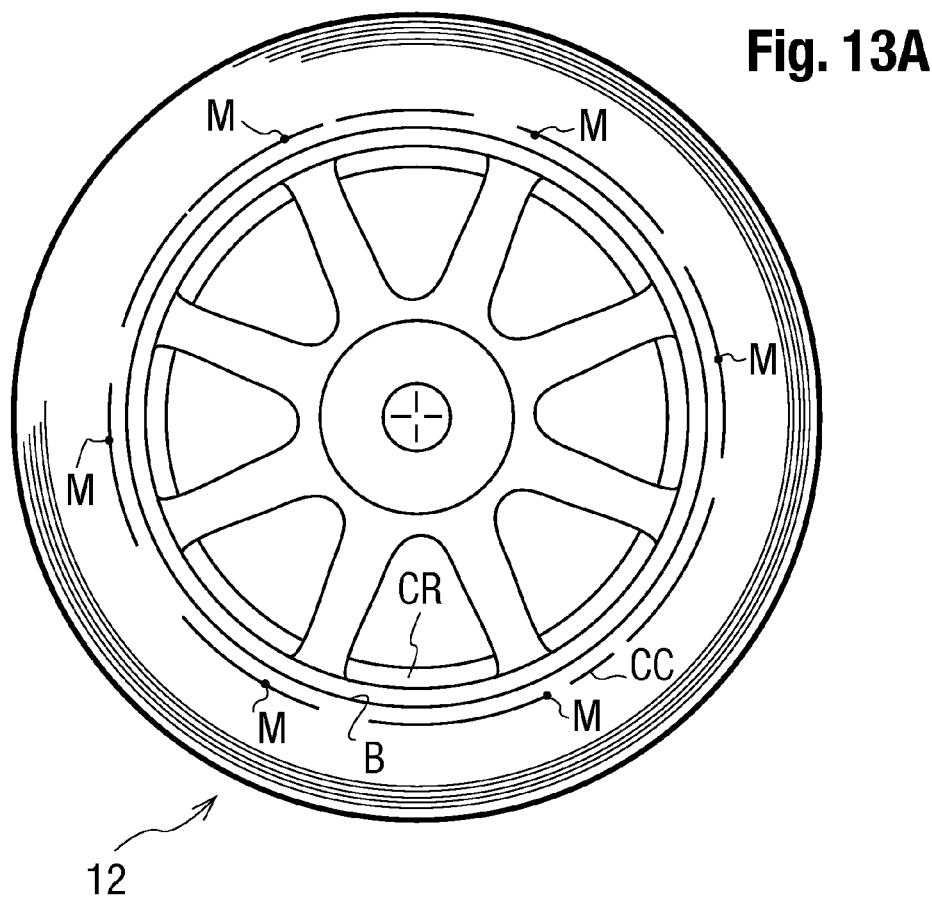
FIG. 13A shows a front view of a wheel with rim to which reference points or non structured markers are applied.

FIG. 13A shows an example of application of markers or reference points M to the edge B of the rim CR or more precisely to a circumference CC approximately concentric to the edge of the rim. By applying the marker points M to a circumference belonging to the surface of the rim errors caused by possible dents in the rim and also by the curvature of the edge of the rim are avoided. Applying the marker points to a circumference concentric to the axis of the wheel and therefore to the rim is relatively easy, as there is always at least one raised circumferential surface area on the tires, due to the design and/or the molding of the tire.

The marker points M are not structured, i.e. do not require to have a known shape. For example, it is sufficient to use circular stickers or also a marking obtained with a felt tip pen. Preferably, the markers M will be invisible and detectable by UV or IR light. The marker points applied to a line on the side surface of the tire concentric to the axis of the wheel will lie approximately in a plane parallel to the median plane of the wheel. Therefore, once the coordinates of the marker points have been determined with respect to the reference system xyz integral with the lift 5, it is possible to determine the coordinates of the plane in which these markers lie, which is parallel to the plane of the wheel.

Figure 13B:
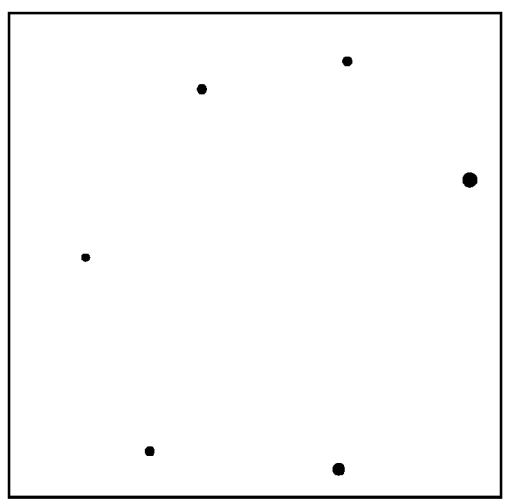
FIG. 13B shows an image of the reference points or markers applied to the rim of the wheel in FIG. 13A.

Taking care to position the video cameras of each pair so as to view both the entire wheel with which they are associated, and the reference 9 on the lift, it is possible to simultaneously acquire the images of the reference 9 and the images of the markers M. The latter are constituted (see FIG. 13B) by white marks corresponding in shape to that of the markers M applied to the rim, with the exception of the perspective deformation due to lack of parallelism between the image plane and the plane in which the circumference CC to which the markers M are applied lies. In general, using circular markers M a corresponding number of small white ellipses on a black background will be obtained on the image plane of the video camera.

The images acquired (both of the target 9 for the calibration step and of the markers M for calculation of the characteristic angles of the wheel) are transferred to the processor 11 for subsequent processing through a USB 2.0 cable or through a frame grabber depending on the type of device used for acquisition. Resolution of the image depends on the acquisition device, just as the quality depends on the settings of the video cameras and on the quality of the objective-lens combination. Higher resolution implies higher measurement precision. With a resolution of 2048×1960 pixels the precision cited above is obtained. In the future, with the development of increasingly high performance technologies, it will also be possible to increase this precision.

The reverse color or negative images (FIG. 13B) of the markers of the various wheels acquired by the video cameras and sent to the processor 11 must be reprocessed with image processing algorithms (known per se, see for example John C. Russ, "*The Image Processing Handbook*", CRC Press, January 2002, pages 383-397) for the purpose of determining the barycentric point of each of the markers (identified in the image of the wheel).

Ignoring for the moment the difficulties deriving from the presence of any light spots in the images acquired not corresponding to the markers M, which can be eliminated with an algorithm which will be described in greater detail below, and therefore assuming that only the images of the markers M will be clearly identifiable on each image, determination of the plane in which each wheel lies will be performed as follows.

For the wheel placed in front of the video cameras TI1, TI2, for example, having obtained the barycentric points of the n markers M indicated thereon in one and in the other of the two stereo images of this wheel taken by the respective pair of video cameras and therefore knowing the planar coordinates $(x_i, z_i)$ and $(x'_i, z'_i)$ of these points in the two images, the corresponding n coordinates 3D of the n points with respect to the reference system XYZ centered on the video camera TI1 are obtained by applying the epipolar geometry and the triangulation principle, with a procedure analogous to the one used to determine the equation of the planes xz, xy, yz. From these coordinates there are obtained the coordinates of the plane in which these points lie (or more precisely of a plane approximating the surface not necessarily exactly flat in which these points lie), with respect to said reference system integral with the video camera TI1. The plane thus identified actually corresponds to the plane in which this wheel lies with respect to the video camera TI1.

In practice, to obtain the coordinates of the plane in which the markers applied to the wheel lie, once the 3D coordinates of the barycentric points of these markers with respect to the video camera of reference TI1 have been obtained, the equation of the plane that approximates to the minimum squares these points with respect to the reference system with center in the video camera TI1 of reference is determined. As mentioned, approximation to the minimum squares is used to eliminate any errors related to marking of the points on the wheel by the operator or defects in shape of the rim. These points lie only approximately in the plane of the wheel, but by using a consistent number of points (at least eight) it is possible to show how the error is drastically reduced so that the validity of the measurement is not nullified.

Once the equation of the plane in which the wheel lies with respect to the video camera TI1 has been identified and knowing the equations of the reference planes xy, xz and yz (also relative to the video camera TI1) it is possible through trigonometric formulae to determine the camber and toe angle of the wheel placed in front of the video cameras TI1, TI2. In fact, this entails calculating the inclination of the line of intersection between the plane of the wheel and, respectively, the plane xy (toe) and the plane xz (camber). The same operation is performed for the other three wheels. Finally, knowing the relations between all the video cameras, it is possible to determine the real measurement of the angles with respect to the absolute reference system.

In actual fact, the toe angles measured with the procedure described above correspond to the real toe angles only if the vehicle has been placed on the lift in a position exactly parallel to the axis x of the system xyz (FIGS. 9A, 9B). However, in actual fact when the vehicle is positioned on the lift it will be disposed with the center line inclined by an angle α with respect to the axis x, i.e. to the longitudinal direction of the lift (run-up of the vehicle). This unknown angle α is added to the effective toe angle of each wheel and must therefore be determined and subtracted from the toe angle determined through the coordinates of the barycentric points of the markers M, obtained with the procedure described above. Knowing the position of each video camera TI2-TI8 with respect to the reference system centered on the center of the CCD of the video camera TI1 allows run-up to be compensated with the following procedure shown with reference to FIG. 14.

Figure 14:
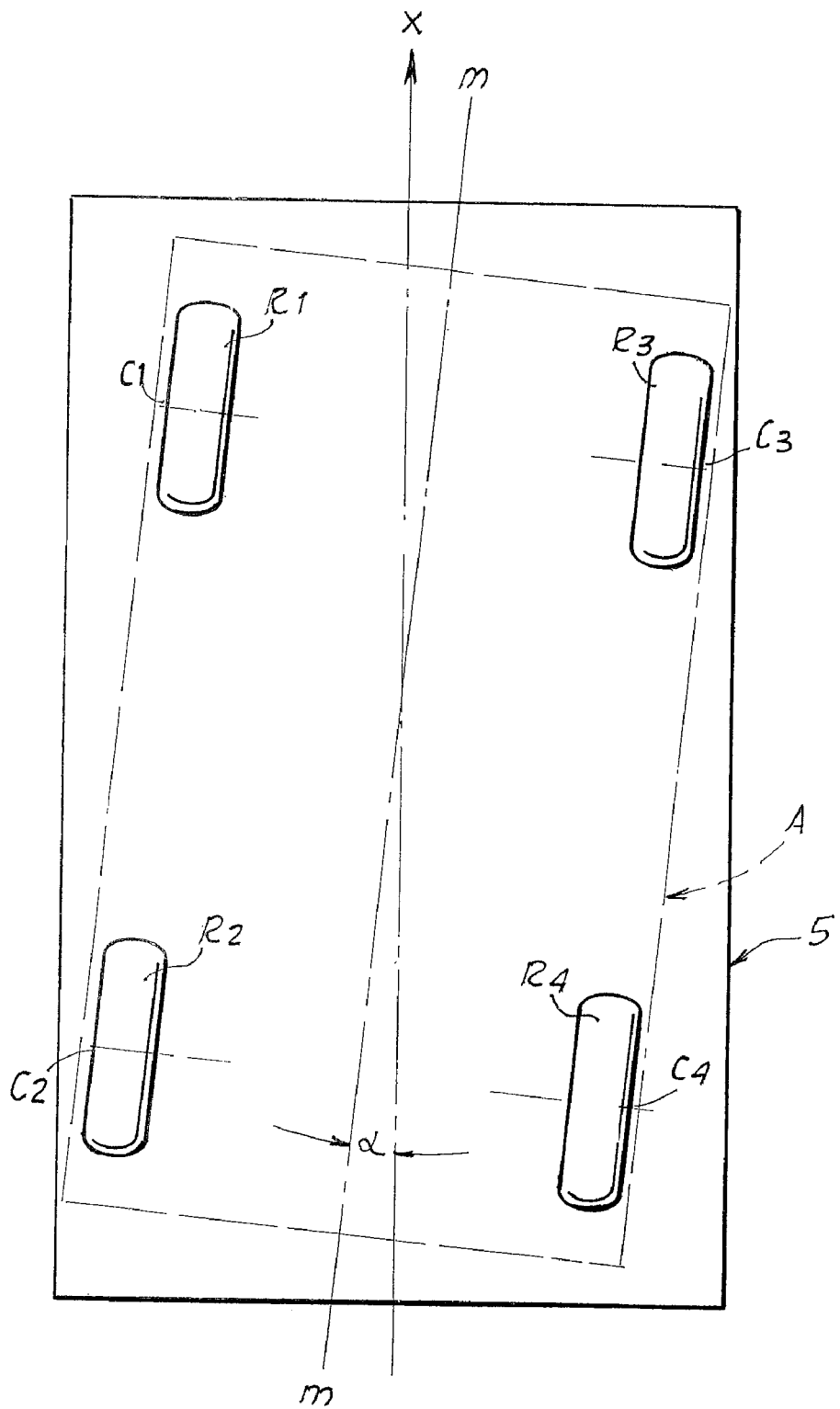
FIG. 14 shows a schematic diagram for the description of the procedure to correct the run-out of the vehicle.

FIG. 14 schematically shows: the front wheels R1, R3, the rear wheels R2, R4 of a motor vehicle or motor car A, the centers C1, C2, C3 and C4 of these wheels, the lift 5, the median axis x of the lift, the trace m-m of the center plane of the motor car on the plane xy and the angle α.

For each wheel the coordinates in space (3D coordinates) of the barycentric points of the markers M are known with respect to the reference system centered on one of the video cameras of the respective pair of video cameras that "observes" this wheel, through the processing procedure described above. As these points lie approximately on a circumference concentric to the axis of the wheel, through processing of the three-dimensional coordinates of the barycentric points for each wheel it is possible to calculate the coordinates of the center of the wheel with respect to the reference system centered on one of the two video cameras of each pair. As the positions of each of the video cameras TI2-TI8 are known with respect to the reference system, taken as absolute, centered on the CCD of the video camera TI1, having calculated the coordinates of the centers C1, C2, C3, C4 in the respective reference systems centered on the video cameras TI1, TI3, TI5 and TI7 respectively, it is possible to calculate the coordinates of all the centers with respect to the reference system centered on TI1. Expressing the coordinates of C1-C4 in the same reference system means knowing the coordinates of the quadrilateral of vertices C1-C4 in this reference system and therefore also calculating the equation of the center line m-m in the same reference system. As the equation of the line representing the axis x of the reference system integral with the lift 5 is known, it is possible to obtain the angle α and from this the real value of the toe angles of the wheels.

Algorithm for Determination of the Coordinates of the Markers on the Wheel and Correspondence Between two Pairs of Stereovision Images In the description above, two simplification were made:
1. it was assumed that on the images of the target 9 and of the markers M on the wheels there are no other visible areas except those corresponding to the markers M and to the FIGS. 9C of the target 9;
2. it was assumed that, knowing the coordinates (xi, zi) and (x'i, z'i) of the barycentric points of the geometrical FIGS. 9C and of the markers M on the two images taken by a pair of video cameras it is possible to determine without the risk of error the correspondence between points of the two images using epipolar geometry.

In actual fact, both these simplifications, useful in order to describe the calculation procedure, may not in actual fact be acceptable, as:

on the images taken by each of the video cameras there can be luminous points corresponding to artefacts differing from the geometric shapes 9C or from the markers. For example, there can be reflections of sunlight that contains the entire range of frequencies including UV or near infrared. Therefore, it is necessary to perform an image processing algorithm that discards any points on the images taken by the video cameras that do not belong to the target 9 or to the markers M on the wheel;

in particular with regard to the markers M, situations can occur in which a specific barycentric point of a marker in an image is not on the epipolar line (determined through the fundamental matrix F that relates the two video cameras of a pair) corresponding to the coordinates of this point in the other image. In other words, it is possible that given a point P1 of coordinates $P_1T_1(x,z)$ in the image plane of the first video camera, the point $P_1T_2(x', z')$ in the image plane of the second video camera does not lie on the corresponding epipolar line, and is not even the point closest to this line.

The algorithm to perform selection of the images of the markers M on the wheel, eliminating other elements or artefacts on the image acquired, and to re-determine through epipolar geometry the biunique correspondence between the barycentric points of the markers on the two stereoscopic images of the same wheel taken by the two video cameras associated therewith will be described with specific reference to FIGS. 15-23. The images in FIGS. 15-22 are reverse color or negatives, meaning that the dark background is shown as white and the bright sources of light are shown in black. The description refers to a single wheel, but it is understood that the same procedure must be performed for all the wheels for which the camber and toe angles are to be measured.

Figure 15:
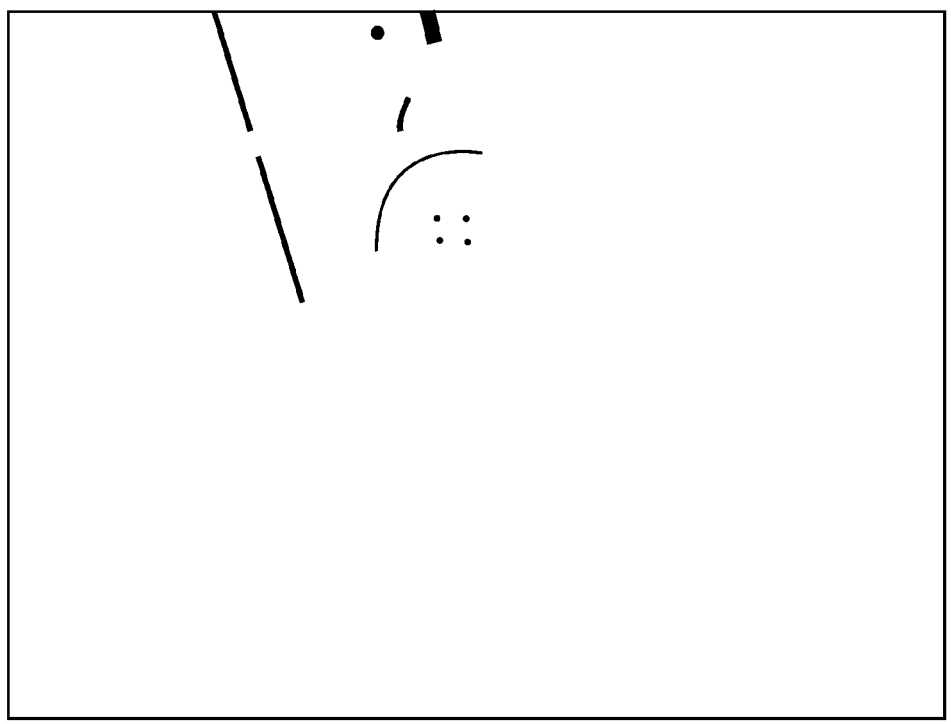

In the first place an image of the wheel with the markers M applied is acquired by each of the two video cameras associated with this wheel with the IR, UV or other light source switched off. FIG. 15 shows a real example of an image acquired in this manner. Acquisition is simultaneous for the two video cameras so that the wheel is in the same position in the two images. Acquisition is performed at 8 bits, i.e. the image obtained is in grayscale and the brightness levels of each point of the image are in a scale 0 (black)-255 (white). For example, the brightness value equal to 128 is a gray. As the acquisition devices are provided with a filter that eliminates frequencies in the visible range, acquisition with IR or UV light switched off allows acquisition of only the contribution of ambient brightness, as can be seen in FIG. 15.

Figure 16:
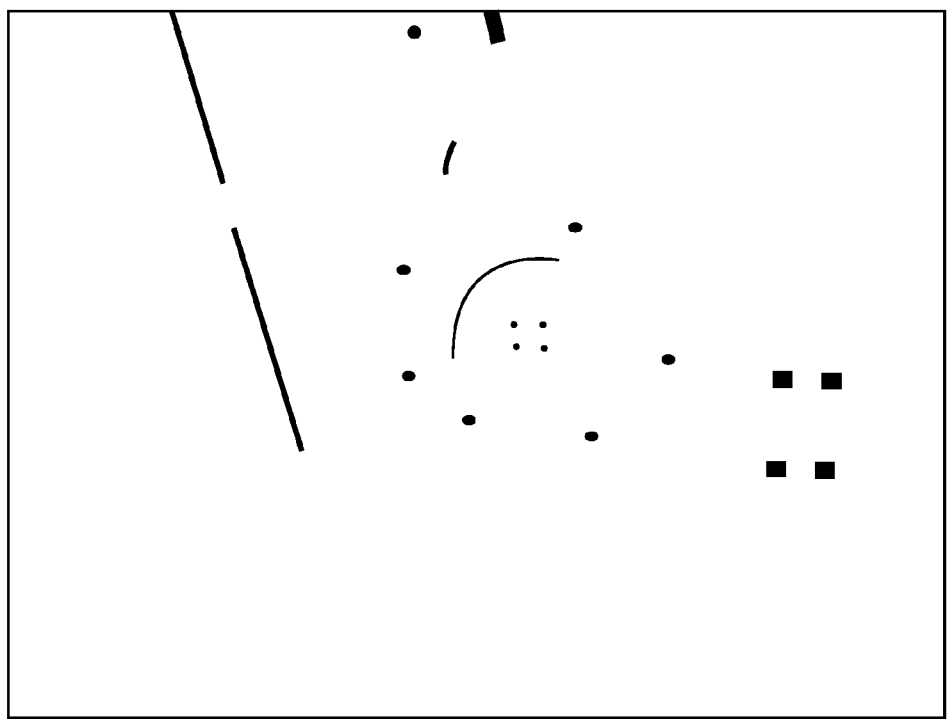

Subsequently, again without moving the wheel, acquisition of the image is performed with the two video cameras with the IR or UV source switched on. In this second operation two pairs of stereo images are acquired in which both the markers on the wheels and the contribution of external lighting are visible. The image is once again at 8 bits. FIG. 16 shows an example of acquisition for one of the two images of the two video cameras. In it the markers on the wheel, disposed approximately on an ellipse, the target 9 integral with the lift 5 (which in this case is represented only by four rectangles on the left of the image, as a different target from the one in FIG. 10 has been used) and again the contribution of external lighting are visible.

Figure 17:
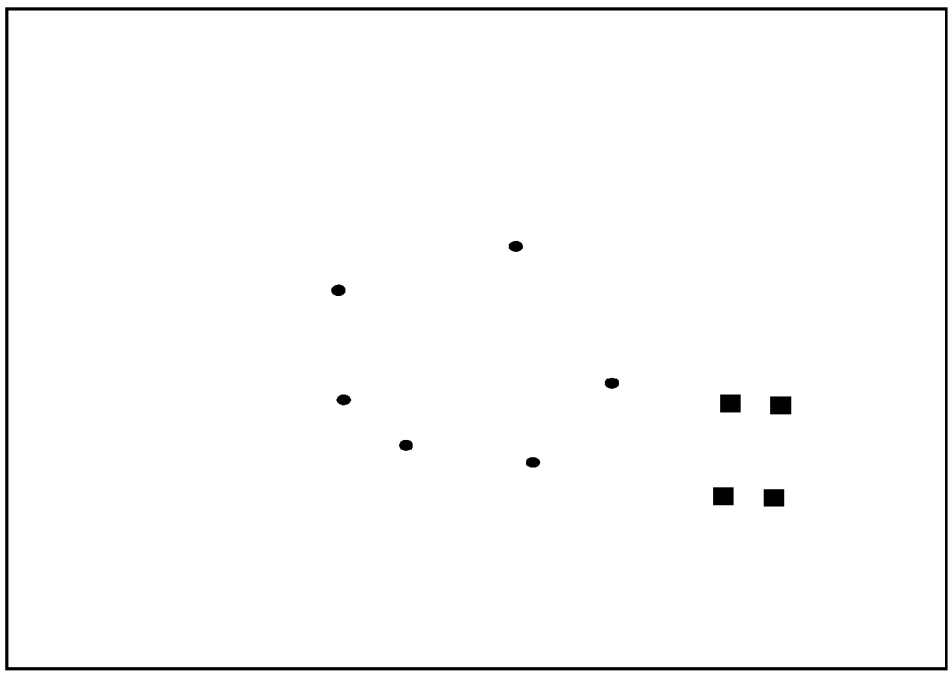

A subtraction between the image acquired with the lighting switched on and the one acquired with the lighting switched off is then performed. In practice, for each video camera the images in FIG. 16 and FIG. 15 are subtracted from each other. Through the difference, this operation eliminates a good part of the ambient effect, as can be seen in FIG. 17, which shows the image obtained from the subtraction.

Figure 18:
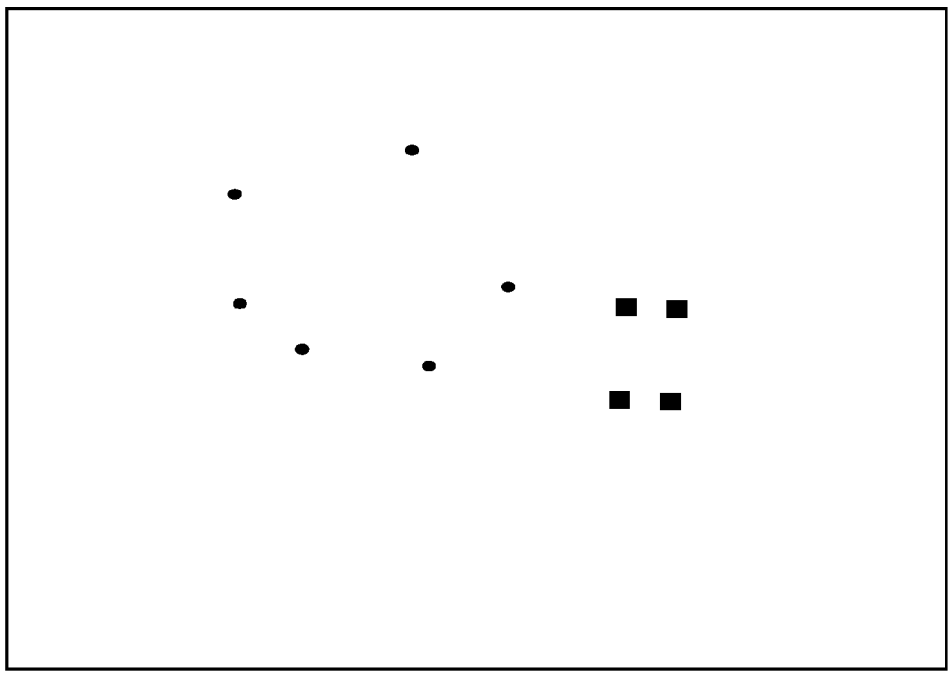

With a known operation, called thresholding (also known as segmentation) a binary image (1 bit) is obtained where the grayscale is substituted only by 0 (black) or 1 (white) values. The effect of the threshold is shown in FIG. 18. In this way all points detected have the value 1 while the background of the image has the value 0.

Figure 19:
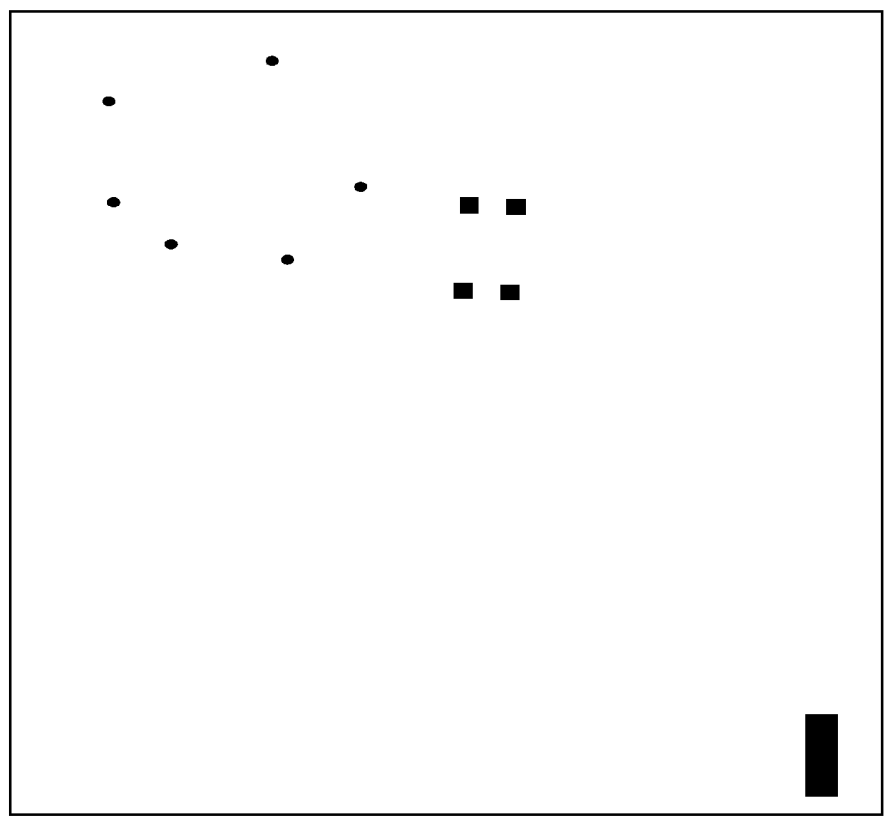

With known algorithms cited in the bibliography (see for example John C Russ: "*The Image Processing Handbook*", ed. CRC Press, January 2002, pages 383-397) the barycenters of all the white "objects" in FIG. 18 are determined. In this case ten barycenters of the ten elements in FIG. 18 are identified, six of which are barycenters of the markers on the wheel and four are barycenters of the markers of the target 9 on the lift 5. In general, there can also be m points caused by the background noise of the image. For example, if the lighting of the scene changes substantially between the steps described above, there can be effects due to this lighting and therefore additional white points. FIG. 19 shows an example of thresholded image in which an area with values 1 appears on the top left, which has not be eliminated by subtraction between the image in FIG. 15 and the image in FIG. 17, as this area is caused by a modification of the conditions of the scene between the first step (acquisition without UV or IR lighting) and the second step (acquisition with UV or IR lighting).

Besides determining the barycenters, the algorithm determines other properties such as the area and the perimeter of the objects. Knowing the real dimensions of the markers M on the wheel and of the geometrical figures on the fixed target 9 and knowing the focal length of the video cameras, it is possible, on the basis of the area of the objects, to clearly separate the points of the target with respect to those on the wheel. In this way it is possible to isolate only n points on the wheel and perform thereon the processing operations required to calculate the toe and camber angles, ignoring the other points, in particular the barycentric points of the figures of the target 9 which are not necessary in this processing step.

Having eliminated the barycentric points of the light areas corresponding to the target 9, it is still necessary to eliminate any other barycentric points of areas of unknown shape, due to artefacts on the image detected, given by elements randomly present on the scene. In the example shown, besides the four barycentric points of the four rectangular areas of the target 9, which can be eliminated by knowing the dimensions and the shapes of these areas, the six points corresponding to the markers on the wheel and the barycentric point of the area on the top left are present on the image. Of these (6+1) points, only the points that lie on an ellipse (or rather that are at a minimum distance, in terms of minimum squares, from an ellipse) are considered, with a specifically developed algorithm. In this way only the barycentric points of the markers on the wheel, that is the points necessary for 3D measurement, remain.

Figure 20:
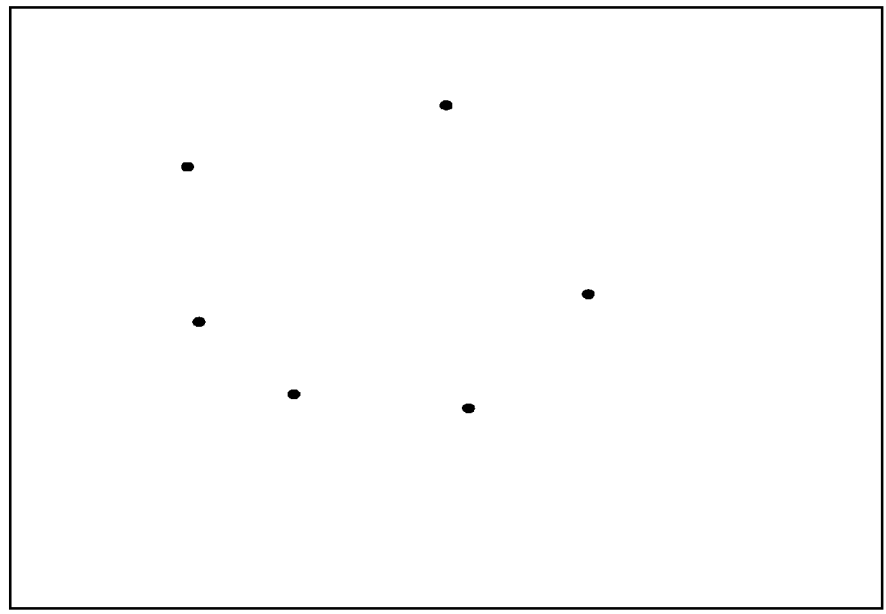

Having eliminated the points that do not contribute to the 3D measurement, an image like the one shown in FIG. 20, with only the six illuminated areas on the wheel, is obtained. At this point it is possible to calculate the n (with n=6 in this example) epipolar lines for each point of one of the two images of the pair. By convention it is assumed that they are calculated starting from the points on the image acquired by the first video camera. The epipolar lines will pass very close to the points on the image taken by the second video camera. FIG. 21A shows the image of the wheel taken by the first video camera, while FIG. 21B shows the image taken by the second video camera. In the first image (FIG. 21A) the illuminated areas, of which the barycentric points are taken into consideration, are numbered from 1 to 6. In the second image the corresponding epipolar lines are indicated and the images of the markers are again numbered from 1 to 6. As already observed above, in theory the barycentric point corresponding to the marker 1 on the first image should be on the corresponding epipolar line in the second image and so forth. For the reasons already explained this is true only in theory, while in practice these barycentric points can be close to, but not exactly on, the corresponding epipolar lines. In general the barycentric point on the second image corresponding to the nth to the barycentric point on the first image is the one closest to the corresponding epipolar line. Through a relation to the minimum squares the correspondences to of the n points are determined for the pair of images, that is for each point of the image in FIG. 21A the corresponding points of the image in FIG. 21B are found Nonetheless, due to the extreme closeness between epipolar lines and to the unpredictable nature of the errors that can occur, in some cases this procedure can lead to an evaluation error. In the example shown the correspondence between the points 3 and 6 is wrong, in the sense that through definition of the epipolar lines and calculation to the minimum squares the processing system has exchanged the points 6 and 3 in the second image. In other words, contrary to the result obtained by the processing operation, the point marked with 3 in FIG. 21B is in actual fact the image of the point indicated with 6 in FIG. 21A. Analogously, the point marked with 6 in FIG. 21B is in actual fact the image of the point marked with 3 in FIG. 21A.

There are various reasons that can cause these errors. For example, the epipolar lines can be almost horizontal; there can still be points of disturbance not eliminated in advance on the images, etc.

As the exact biunique correspondence between the barycentric points of the two images taken by the two video cameras must be known in order to determine the position of the plane in which the wheel lies, as otherwise triangulation would give an entirely wrong result, for further control and to eliminate the points that give rise to an error of this type the epipolar lines are calculated starting from the points of the image in FIG. 21A. In other words, the procedure is performed again to find, through epipolar geometry, the points that in one image correspond to those of the other, but starting from the points in FIG. 21B and tracing the corresponding epipolar lines in FIG. 21A. This time, as can be seen in FIG. 22A and 22B, the epipolar line determined by the point 3 of the image in FIG. 22B (which in actual fact is the point 6 of the image in FIG. 22A) passes close to the point 6 of the image in FIG. 22A, but the same occurs for the epipolar determined starting from the point 6 of the image in FIG. 22B, which therefore again passes close to the point 6 of the image in FIG. 22A. Consequently the point 3 of the image in FIG. 22A is discarded, as is its corresponding point in the image in FIG. 22B.

The operation could even cause all the points to be discarded; through control of the algorithm it is possible to remain in standby and to start the acquisition cycle again if the number of points discarded is above a preset value. This limit situation is very difficult to verify and by choosing an adequate number (such as eight or more) markers on the wheel high measurement precision is obtained also in the case of one or more points being discarded.

Figure 23:
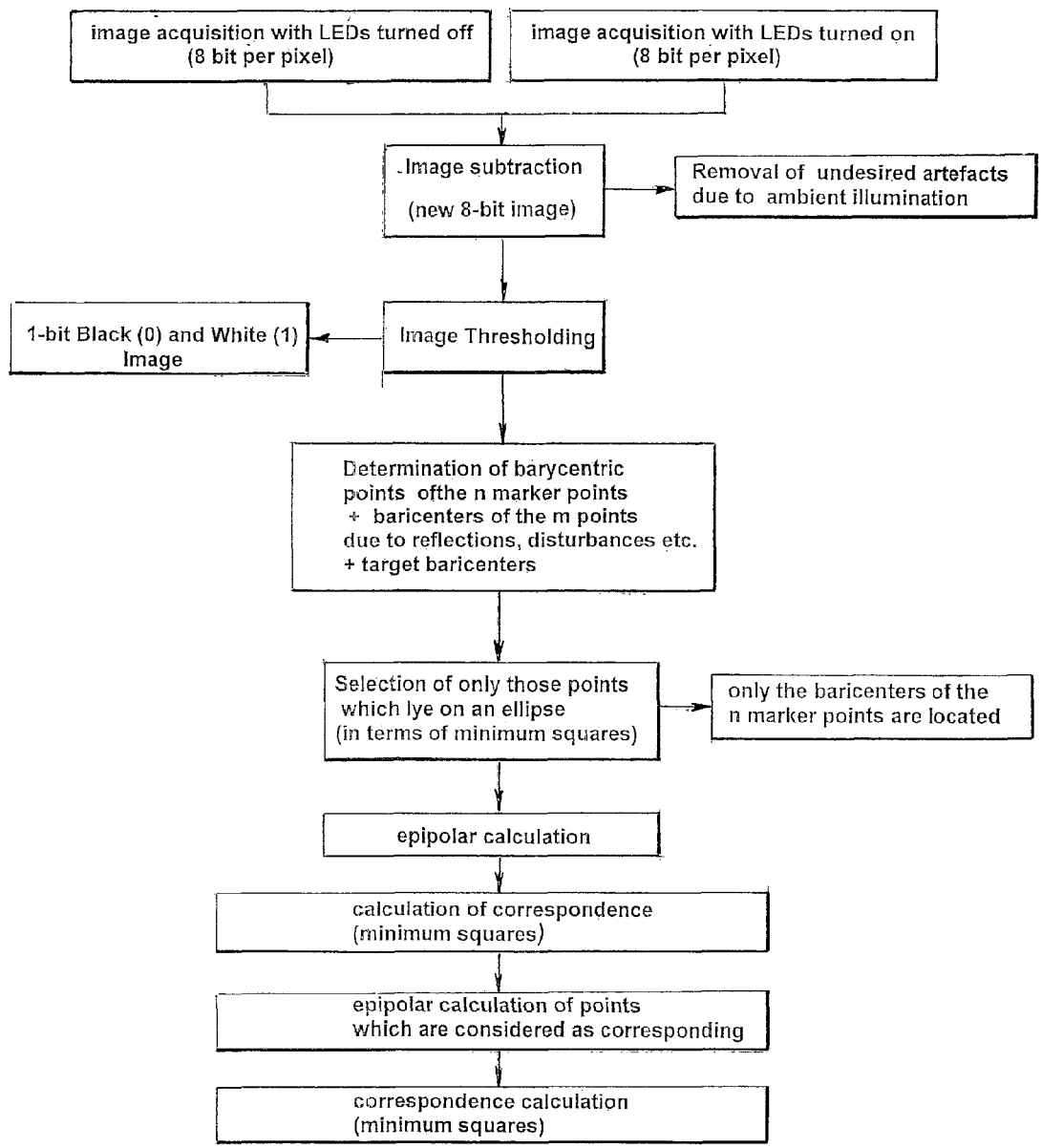
FIG. 23 shows a summarizing diagram of the aforesaid algorithm.

The entire algorithm described above with reference to FIGS. 15 to 22 is summarized in the block diagram in FIG. 23.

A similar algorithm can be used to calibrate the video cameras using the targets 9, although in this case the error due to incorrect allocation of the points of one image with respect to those of the other are rarer, due to the shape which can be given to the geometrical figures on the target 9.

It is understood that the drawing only shows possible embodiments of the invention, which can vary in forms and arrangements without however departing from the scope of the concept underlying the invention.

What we claim is:

1. A method for measuring the angles of inclination of the wheels of a motor vehicle, comprising the steps of:
    applying a plurality of markers to the wheels of the motor vehicle;
    providing, at each wheel whose characteristic angles must be acquired, a first image acquisition device and a second image acquisition device, said pair of image acquisition devices having different inclinations and positions with respect to said wheel;
    for each of said wheels, acquiring at least a first image and a second image of said wheel with the relative markers by means of said first and second image acquisition device respectively;
    determining the two-dimensional coordinates of the barycentric points of said markers in said first and second image, respectively;
    by means of an operation using epipolar geometry, determining the correspondence between the barycentric points on said first image and the barycentric points on the second image;
    on the basis of the coordinates of said barycentric points in the first and second image, determining by triangulation the coordinates of said barycentric points in a three-dimensional reference system;
    determining, in said three-dimensional reference system, the equation of an approximate plane in which said markers lie in space, said plane being approximately parallel to the plane in which the wheel lies;
    determining the camber and toe angles of said wheel on the basis of the equation of said plane in which the markers lie and of the equation of reference planes with respect to which the motor vehicle takes a known position.

2. Method as claimed in claim 1, further comprising the step of determining the position of said motor vehicle with respect to the reference planes on the basis of the position of the acquisition devices with respect to a single reference system.

3. Method as claimed in claim 2, wherein said single reference system is centered on one of said acquisition devices.

4. Method as claimed in claim 3, wherein said reference planes are planes of a Cartesian reference system, having a specific position with respect to a supporting structure of the motor vehicle.

5. Method as claimed in claim 2, wherein said reference planes are planes of a Cartesian reference system, having a specific position with respect to a supporting structure of the motor vehicle.

6. Method as claimed in claim 1, wherein said reference planes are planes of a Cartesian reference system, having a specific position with respect to a supporting structure of the motor vehicle.

7. Method as claimed in claim 6, wherein said supporting structure is a lift on which said motor vehicle is disposed.

8. Method as claimed in claim 7, wherein a first of said reference planes coincides approximately with a supporting surface of the motor vehicle and a second of said reference planes is substantially orthogonal to said first reference plane and approximately parallel to the center line of the motor vehicle.

9. Method as claimed in claim 6, wherein a first of said reference planes coincides approximately with a supporting surface of the motor vehicle and a second of said reference planes is substantially orthogonal to said first reference plane and approximately parallel to the center line of the motor vehicle.

10. Method as claimed in claim 9, wherein said first reference plane is approximately horizontal.

11. Method as claimed in claim 8, further comprising the step of determining the position in space of the centers of the wheels of the motor vehicle; on the basis of this position, calculating the angle of inclination between the center line of the motor vehicle and said second reference plane; and on the basis of said angle of inclination, correcting the toe angle calculated on the basis of the images acquired by said acquisition devices.

12. Method as claimed in claim 1, further comprising the step of determining the reciprocal position between said acquisition devices and a supporting structure of the motor vehicle through calibration of said acquisition devices using targets integral with said structure and in a known position with respect to said reference planes.

13. Method as claimed in claim 12, further comprising the step of arranging at least one of said targets on each side of said supporting structure.

14. Method as claimed in claim 12, wherein the positions of each of said acquisition devices with respect to an absolute reference system centered on one of said acquisition devices are determined through said targets and the known position of said targets with respect to the supporting structure.

15. Method as claimed in claim 1, further comprising the step of arranging at least one pair of said first and second acquisition devices in known and fixed reciprocal positions on a common support.

16. Method as claimed in claim 15, wherein the acquisition devices for each wheel are placed on said common support.

17. Method as claimed in claim 15, wherein on each side of the motor vehicle there are arranged four of said first and second acquisition devices, constrained to one another in fixed positions through said common support.

18. Method as claimed in claim 1, wherein said acquisition devices acquire images in a range of invisible radiations, said markers reflecting a radiation in said range of invisible radiations.

19. Method as claimed in claim 18, wherein said range of radiations is a UV or IR range.

20. Method as claimed in claim 1, wherein said acquisition devices are video cameras.

21. Method as claimed in claim 1, further comprising a single and stereo calibration operation of said two acquisition devices associated with each wheel, to determine the characteristics of the acquisition devices and their reciprocal position.

22. Method as claimed in claim 21, wherein said single and stereo calibration is performed by acquiring and processing a plurality of images of a target movable with respect to the acquisition devices.

23. Method as claimed in claim 1, further comprising the step of providing a supporting structure of the motor vehicle; and wherein, once the acquisition devices have been positioned with respect to said structure, a calibration operation is performed to determine the position of the acquisition devices with respect to the supporting structure and the position of the acquisition devices with respect to an absolute reference system, integral with one of said acquisition devices.

24. Method as claimed in claim 23, wherein, having defined the reciprocal position of the acquisition devices of said first and second acquisition devices associated with each wheel of the motor vehicle, the relative position of said first and second acquisition devices in relation to the supporting structure is performed by said calibration operation using one or more targets integral with the supporting structure.

25. Method as claimed in claim 1, further comprising the steps of:
   identifying the coordinates of said barycentric points corresponding to the markers on the wheel on said first image;
   determining on said second image the epipolar lines corresponding to the barycentric points on the first image;
   determining the coordinates of said barycentric points on the second image identifying, for each epipolar line the barycentric point closest thereto and assuming said closest barycentric point as the barycentric point corresponding to the barycentric point on the first image with which the relative epipolar line is associated.

26. Method as claimed in claim 25, further comprising the steps of:
   identifying the coordinates of said barycentric points corresponding to the markers on the wheel on the second of said two images;
   determining on said first image the epipolar lines corresponding to the barycentric points on the second image;
   determining the coordinates of said barycentric points on the first image identifying, for each epipolar line the barycentric point closest thereto and assuming said closest barycentric point as the barycentric point corresponding to the barycentric point on the second image with which the relative epipolar line is associated;
   discarding the barycentric points for which a biunique correspondence of coordinates has not been identified.

27. Method according to claim 1, wherein said markers are applied along a line approximately circumferential and approximately coaxial with the wheel.

28. A device for measuring the angles of inclination of the wheels of a motor vehicle, comprising:
   a motor vehicle supporting structure;
   for each wheel of the motor vehicle, a pair of image acquisition devices;
   a control and processing unit programmed to perform a measurement method as claimed in claim 1.

29. Device as claimed in claim 28, wherein on said supporting structure of the motor vehicle there are disposed at least two targets, one on each side.

30. Device as claimed in claim 29, wherein said targets and said acquisition devices are arranged such that each pair of said acquisition devices can simultaneously see a wheel of the vehicle and a target.

31. Device as claimed in claim 28, wherein the pair of acquisition devices associated with each wheel of the motor vehicle are mounted on a common support.

32. Device as claimed in claim 31, wherein said common supports are fixed.

33. Device as claimed in claim 31, wherein at least some of said common supports are movable.

34. Device as claimed in claim 33, further comprising two of said common supports, one for each side of the motor vehicle, said supports both being movable and each one comprising two said pairs of said acquisition devices.

35. Device as claimed in claim 33, further comprising four of said common supports, each said common support being provided with a pair of said acquisition devices.

36. Device as claimed in claim 35, wherein said four common supports are movable.

37. Device as claimed in claim 35, wherein two of said common supports are fixed and two of said common supports are movable.

38. Device as claimed in claim 31, wherein at least one of said common supports is movable on a guide.

39. Device as claimed in claim 38, further comprising at least one transducer to determine the position of said at least one movable common support.

40. Device as claimed in claim 28, wherein two said pairs of said acquisition devices associated with two wheels on a same side of the motor vehicle are mounted on a single common support.

41. Device as claimed in claim 28, wherein said acquisition device acquires images in a range of invisible frequencies.

42. Device as claimed in claim 41, wherein said acquisition devices acquire UV or IR images.

43. Device as claimed in claim 28, wherein said acquisition devices are video cameras.

44. Device as claimed in claim 28, further comprising UV or IR light means.

45. A method for measuring the angles of inclination of the wheels of a motor vehicle, comprising the steps of:
   applying a plurality of markers to the wheels of the motor vehicle;
   providing, at each wheel whose characteristic angles must be acquired, a first image acquisition device and a second image acquisition device, said two image acquisition devices having different inclinations and positions with respect to said wheel;
   for each of said wheels, acquiring at least a first image and a second image of said wheel with the relative markers by means of said first and second image acquisition device respectively;
   identifying the coordinates of said barycentric points corresponding to the markers on the wheel on said first image;
   determining on said second image the epipolar lines corresponding to the barycentric points on the first image;
   determining the coordinates of said barycentric points on the second image identifying, for each epipolar line, the barycentric point closest thereto and assuming said closest barycentric point as the barycentric point corresponding to the barycentric point on the first image with which the relative epipolar line is associated;
   on the basis of the coordinates of said barycentric points in the first and second image, determining by triangulation the coordinates of said barycentric points in a three-dimensional reference system;
   determining, in said three-dimensional reference system, the equation of an approximate plane in which said markers lie in space, said plane being approximately parallel to the plane in which the wheel lies;
   determining the camber and toe angles of said wheel on the basis of the equation of said plane in which the markers lie and of the equation of reference planes with respect to which the motor vehicle takes a known position.

46. A method for measuring the angles of inclination of the wheels of a motor vehicle, comprising the steps of:
   applying a plurality of markers to the wheels of the motor vehicle;
   providing, at each wheel whose characteristic angles must be acquired, a first image acquisition device and a second image acquisition device, said two image acquisition devices having different inclinations and positions with respect to said wheel;

for each of said wheels, acquiring at least a first image and a second image of said wheel with the relative markers by means of said first and second image acquisition device respectively;

identifying the coordinates of said barycentric points corresponding to the markers on the wheel on said first image;

determining on said second image the epipolar lines corresponding to the barycentric points on the first image;

determining the coordinates of said barycentric points on the second image identifying, for each epipolar line, the barycentric point closest thereto and assuming said closest barycentric point as the barycentric point corresponding to the barycentric point on the first image with which the relative epipolar line is associated;

identifying the coordinates of said barycentric points corresponding to the markers on the wheel on the second of said two images;

determining on said first image the epipolar lines corresponding to the barycentric points on the second image;

determining the coordinates of said barycentric points on the first image identifying, for each epipolar line the barycentric point closest thereto and assuming said closest barycentric point as the barycentric point corresponding to the barycentric point on the second image with which the relative epipolar line is associated;

discarding the barycentric points for which a biunique correspondence of coordinates has not been identified;

on the basis of the coordinates of said barycentric points in the first and second image, determining by triangulation the coordinates of said barycentric points in a three-dimensional reference system;

determining, in said three-dimensional reference system, the equation of an approximate plane in which said markers lie in space, said plane being approximately parallel to the plane in which the wheel lies;

determining the camber and toe angles of said wheel on the basis of the equation of said plane in which the markers lie and of the equation of reference planes with respect to which the motor vehicle takes a known position.

\* \* \* \* \*